(12) United States Patent
Wolff et al.

(10) Patent No.: US 12,344,145 B2
(45) Date of Patent: Jul. 1, 2025

(54) COMPONENT FOR VEHICLE INTERIOR

(71) Applicant: Shanghai Yanfeng Jinqiao Automotive Trim Systems Co. Ltd., Novi, MI (US)

(72) Inventors: Martin Wolff, Hattingen (DE); Andreas Schmidhuber, Duesseldorf (DE); Turgay Erkis, Weeze (DE); Martjin Kenis, Arcen (NL)

(73) Assignee: Shanghai Yanfeng Jinqiao Automotive Trim Systems Co. Ltd., Novi, MI (US)

( * ) Notice: Subject to any disclaimer, the term of this patent is extended or adjusted under 35 U.S.C. 154(b) by 171 days.

(21) Appl. No.: 18/307,137

(22) Filed: Apr. 26, 2023

(65) Prior Publication Data
US 2023/0256878 A1    Aug. 17, 2023

Related U.S. Application Data

(63) Continuation of application No. PCT/US2021/057115, filed on Oct. 28, 2021.
(Continued)

(51) Int. Cl.
*B60N 2/75* (2018.01)
*B60R 21/00* (2006.01)
*B60R 21/02* (2006.01)

(52) U.S. Cl.
CPC ............... *B60N 2/78* (2018.02); *B60R 21/02* (2013.01); *B60R 2021/0006* (2013.01)

(58) Field of Classification Search
CPC ........ B60N 2/78; B60N 2/4235; B60N 2/427; B60N 2/75; B60R 21/02;
(Continued)

(56) References Cited

U.S. PATENT DOCUMENTS 5,395,161 A    3/1995 Spykerman et al.
5,549,327 A    8/1996 Rusche et al.
(Continued)

FOREIGN PATENT DOCUMENTS

DE    10 2009 022 325 A1    12/2009
DE       102009060380 A1     6/2011
(Continued)

OTHER PUBLICATIONS

Extended European Search Report received for European Patent Application Serial No. 21887551.6 dated Sep. 13, 2024 pages.
(Continued)

*Primary Examiner* — Amy R Weisberg
*Assistant Examiner* — Denise Lynne Esquivel
(74) *Attorney, Agent, or Firm* — Amin, Turocy & Watson, LLP

(57) ABSTRACT

A vehicle interior component configured for response in event of a side impact may comprise an armrest assembly for a door panel. The armrest assembly may comprise a base section and an armrest section and a region configured for response to side impact at the door panel. The region may comprise a movable/deformable structure. Response of the armrest assembly may comprise deformation to partially absorb force and/or movement of the armrest section relative to the base section to partially cover the base section. The armrest assembly may comprise a carrier and/or mechanism to attach the armrest section to the door panel. The carrier/mechanism may be configured to guide/direct movement of the armrest section and/or to partially absorb the side impact force. The mechanism may comprise a set of pins movable within a set of slots to provide for movement of the armrest section.

20 Claims, 15 Drawing Sheets

Related U.S. Application Data

(60) Provisional application No. 63/107,019, filed on Oct. 29, 2020.

(58) Field of Classification Search
CPC ........ B60R 2021/0006; B60R 21/0428; B60R 2021/0039; B60J 5/0461
USPC .................. 296/187.12, 153, 1.09, 146.7
See application file for complete search history.

(56) References Cited

U.S. PATENT DOCUMENTS

| | | | |
|---|---|---|---|
| 7,357,443 | B2 | 4/2008 | Wolff et al. |
| 9,145,076 | B2 | 9/2015 | Platzek et al. |
| 10,081,283 | B2 * | 9/2018 | Jayasuriya ......... B60N 2/42709 |
| 10,457,178 | B2 | 10/2019 | Shimizu |
| 10,464,457 | B1 * | 11/2019 | Doan .................. B60R 13/0243 |
| 10,464,493 | B2 * | 11/2019 | Dunham ................ B60R 7/046 |
| 10,583,760 | B2 | 3/2020 | Vemulapati et al. |
| 2015/0375692 | A1 * | 12/2015 | Migaki ............... B60R 13/0243 296/1.08 |
| 2016/0368402 | A1 | 12/2016 | Hamdoon et al. |
| 2018/0111578 | A1 * | 4/2018 | Bozio ................ B60R 21/0428 |
| 2018/0186306 | A1 | 7/2018 | Fitzpatrick et al. |

FOREIGN PATENT DOCUMENTS

| | | |
|---|---|---|
| DE | 10 2011 102 302 A1 | 1/2012 |
| DE | 10 2011 101 574 A1 | 4/2012 |
| JP | H07315076 A | 12/1995 |
| KR | 1998-0031401 U | 8/1998 |

OTHER PUBLICATIONS

International Search Report issued for International Application No. PCT/US21/57115 dated Feb. 17, 2022, 17 pages.

\* cited by examiner

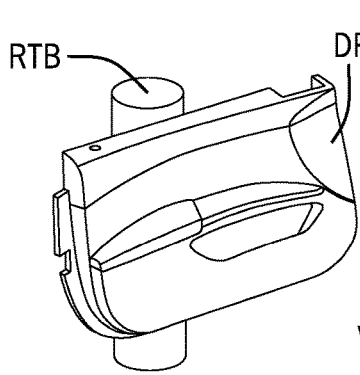
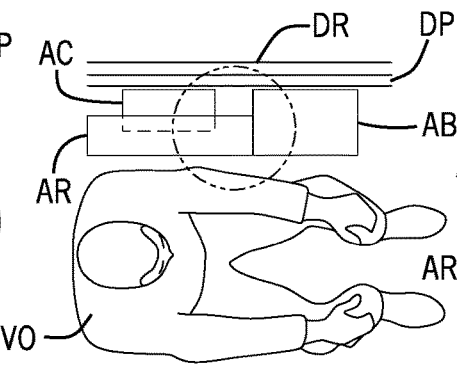
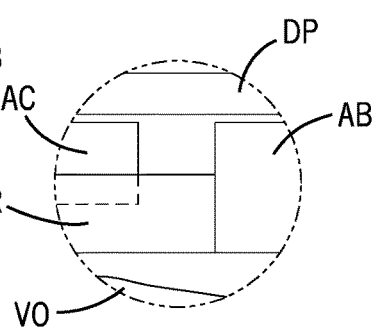
FIG. 13A     FIG. 13B     FIG. 13C
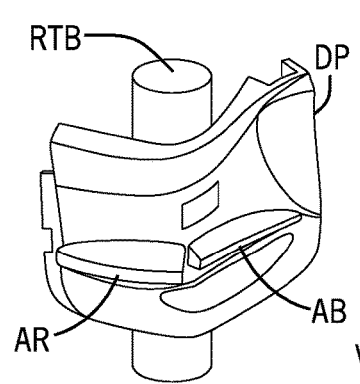
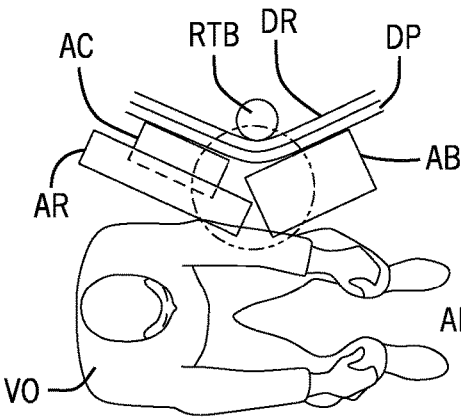
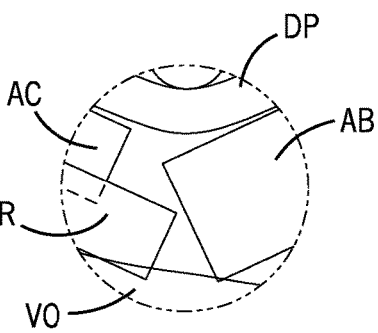
FIG. 14A     FIG. 14B     FIG. 14C
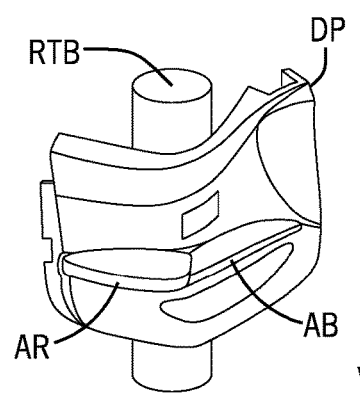
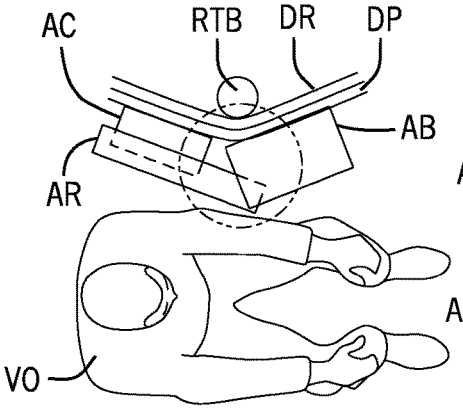
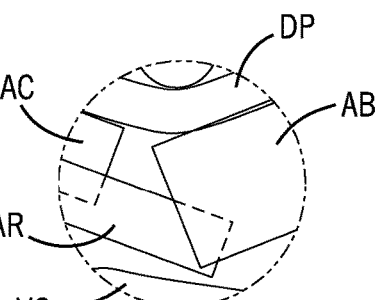
FIG. 15A     FIG. 15B     FIG. 15C

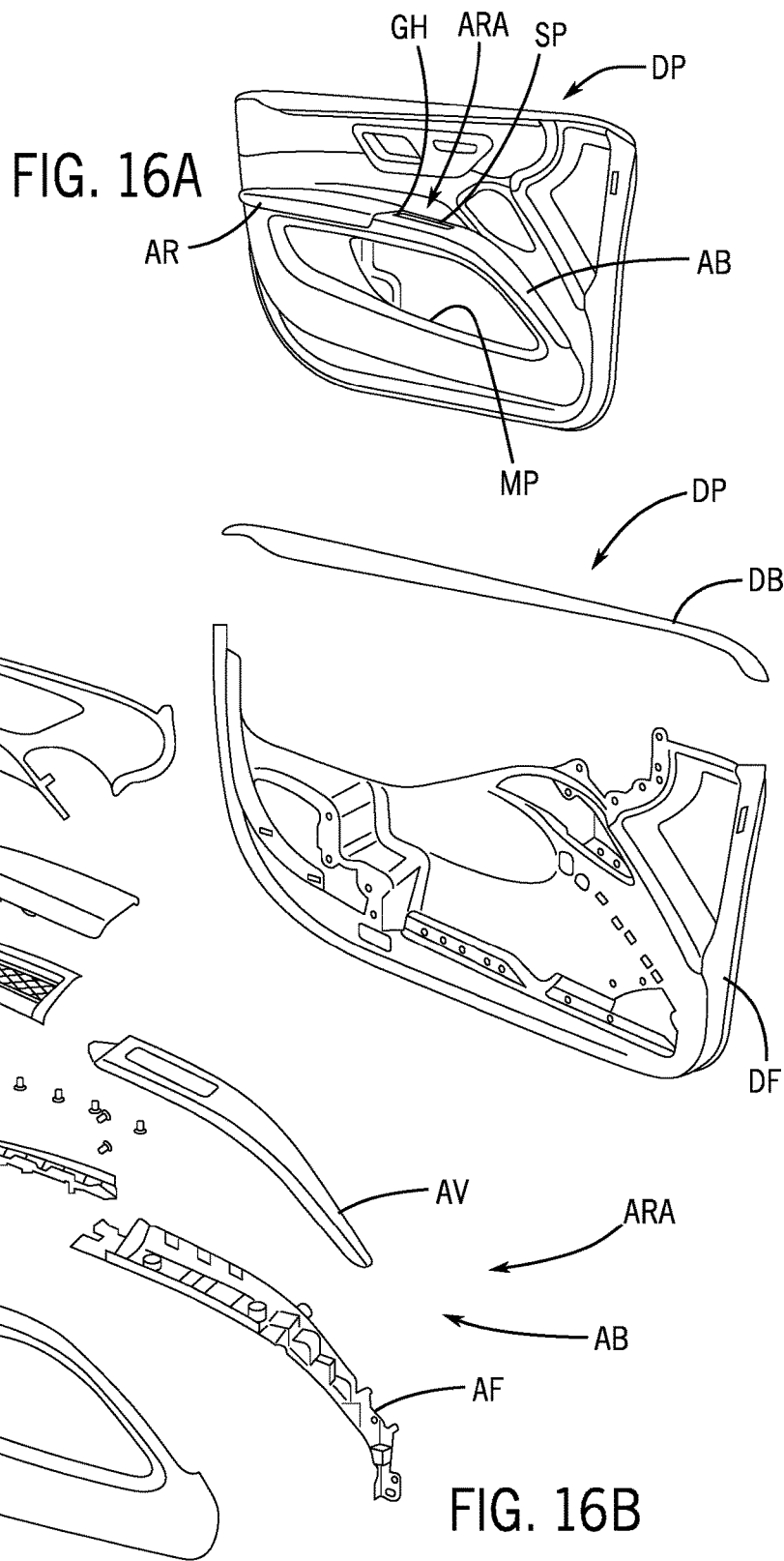

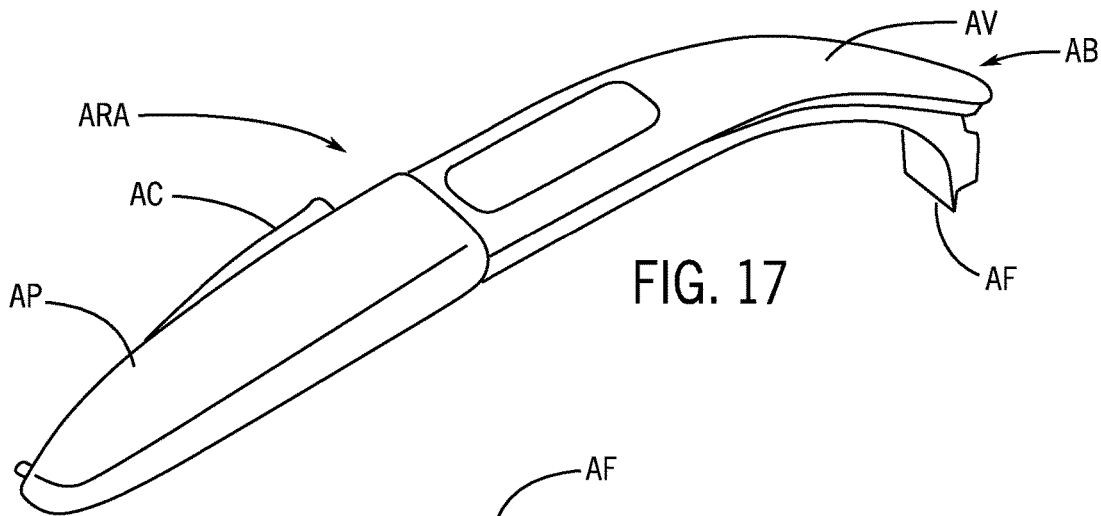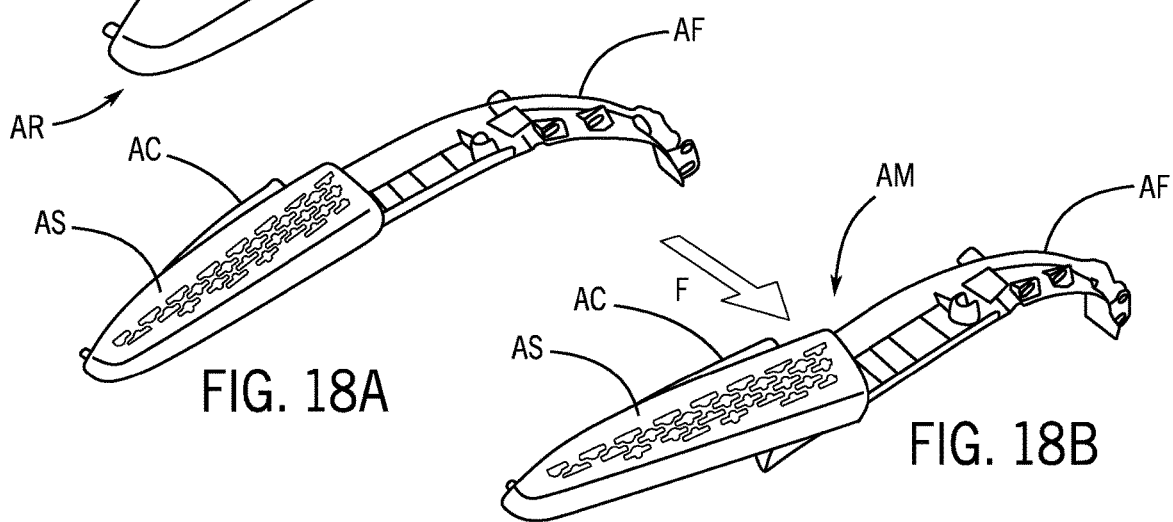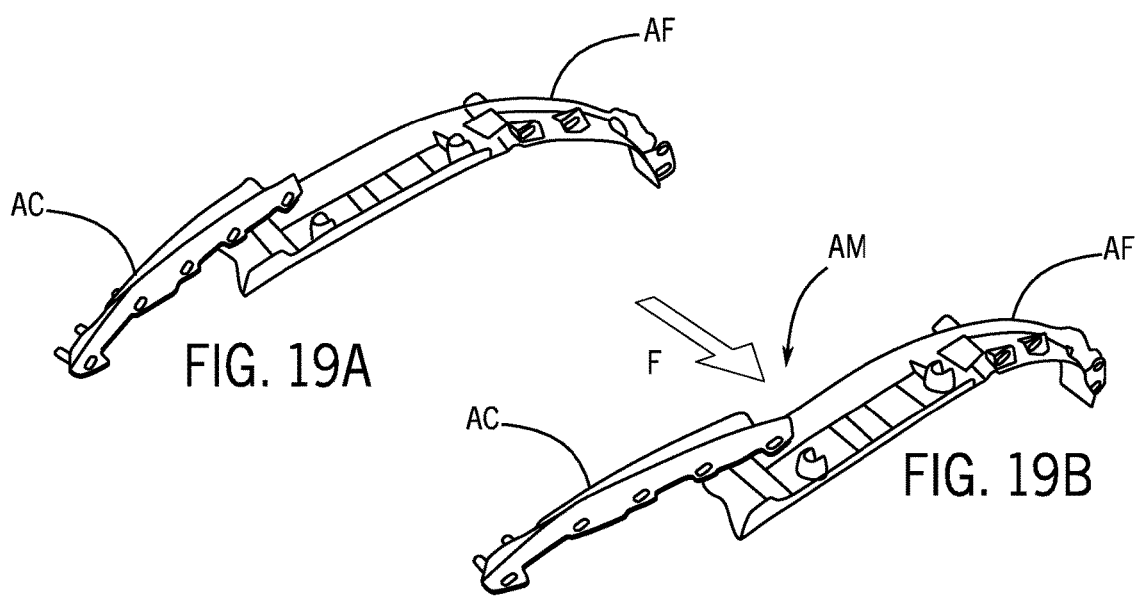

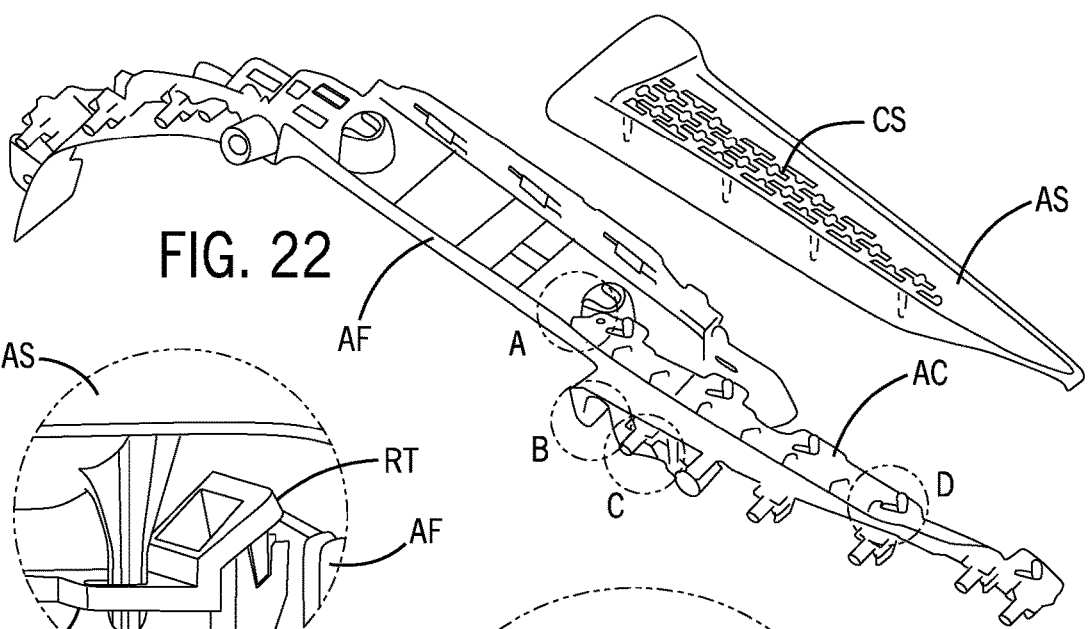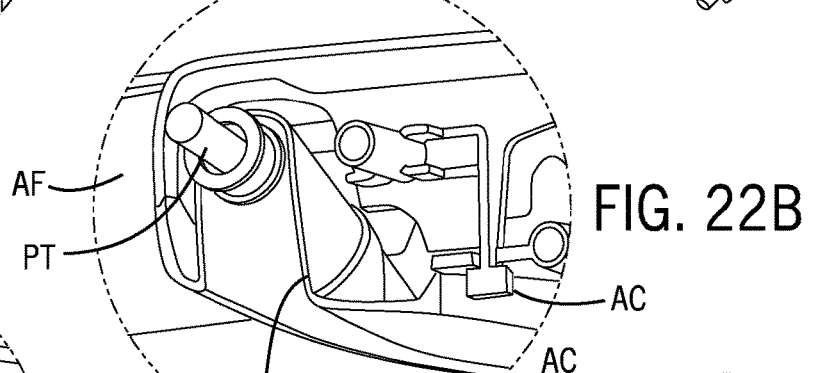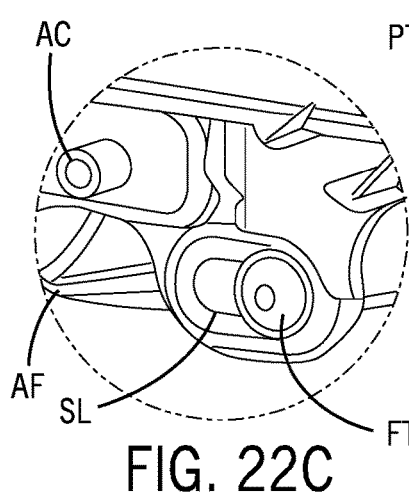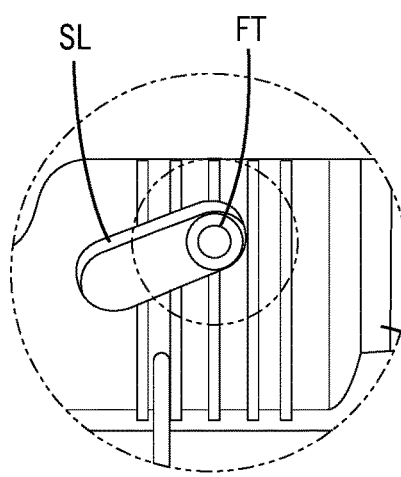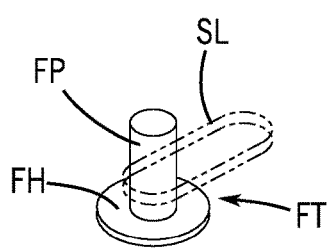

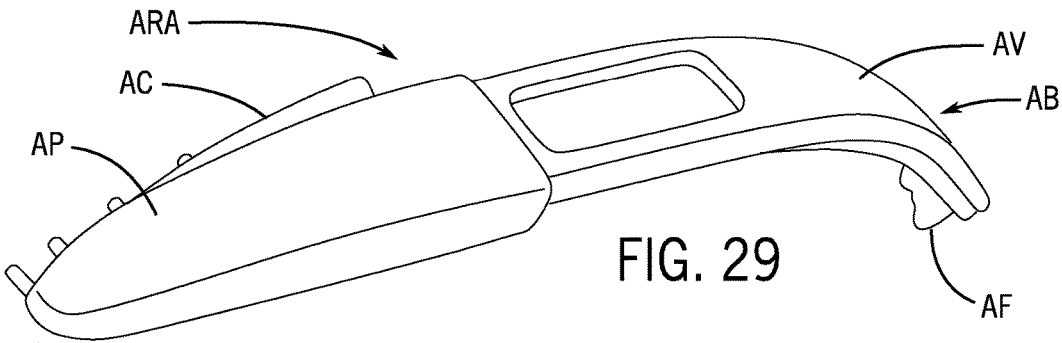
FIG. 29
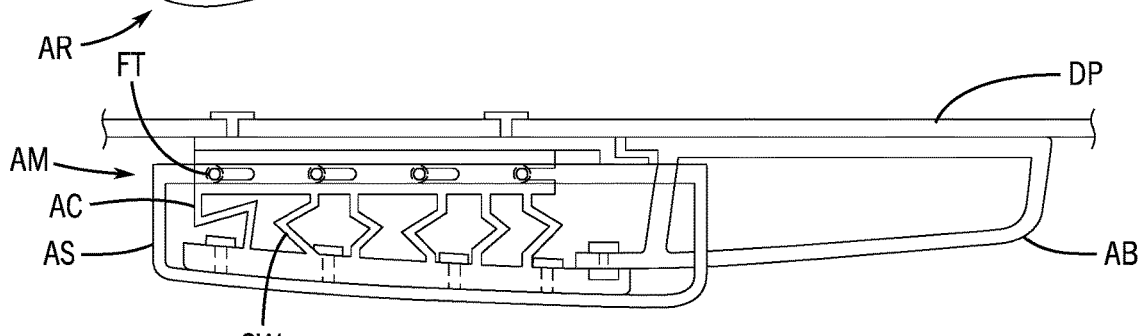
FIG. 30A
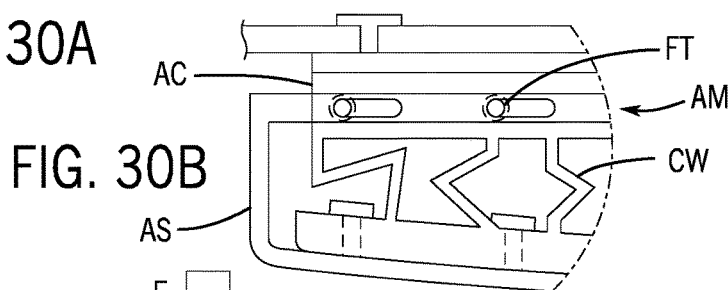
FIG. 30B
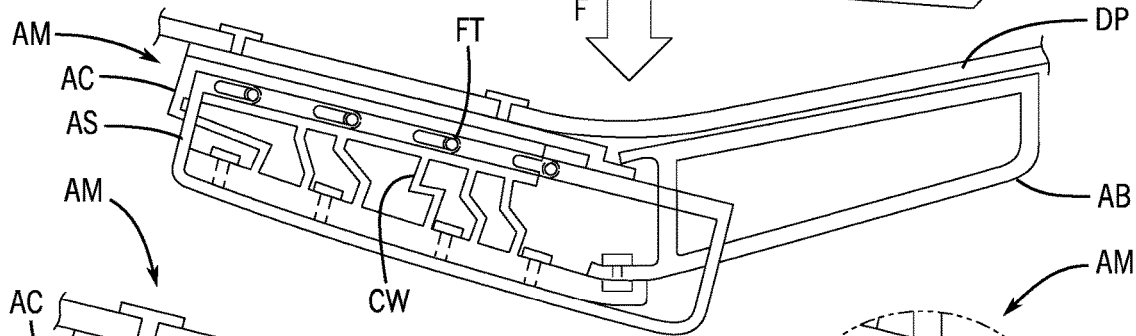
FIG. 31A
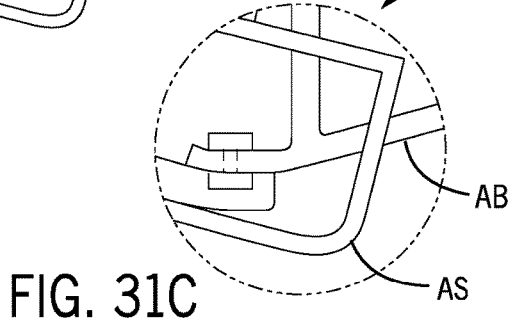
FIG. 31B
FIG. 31C

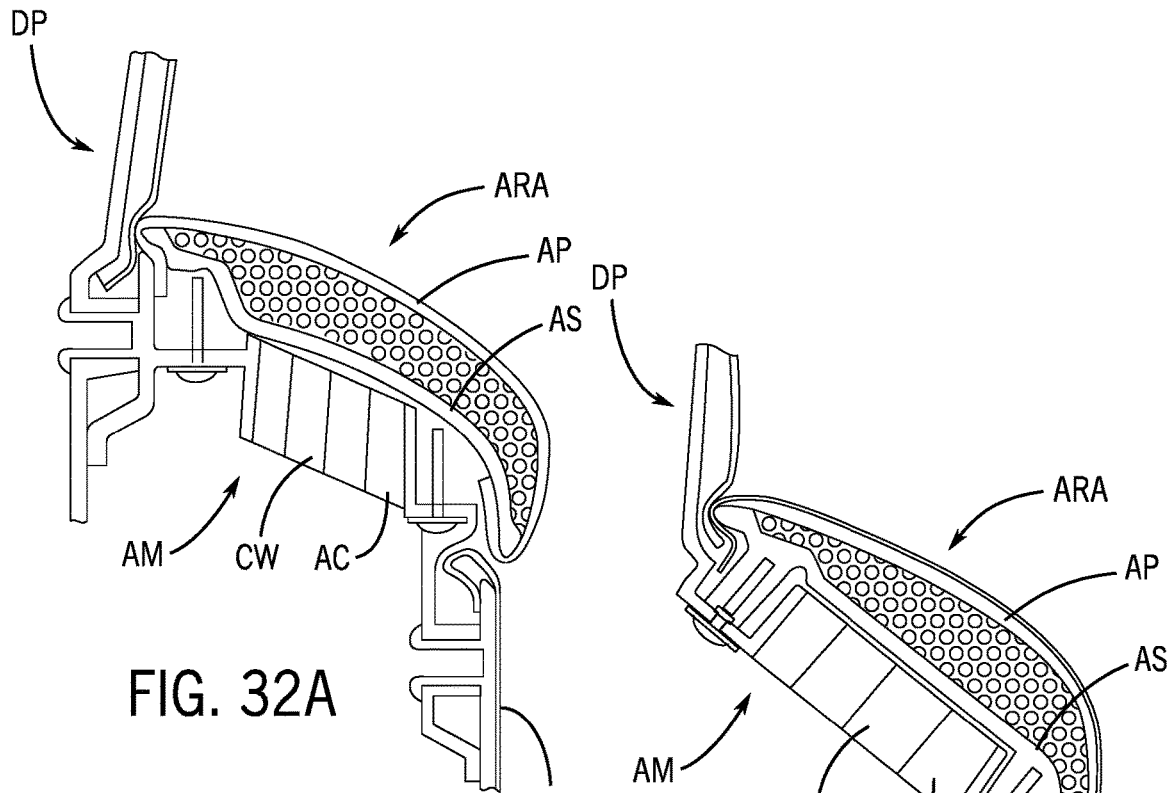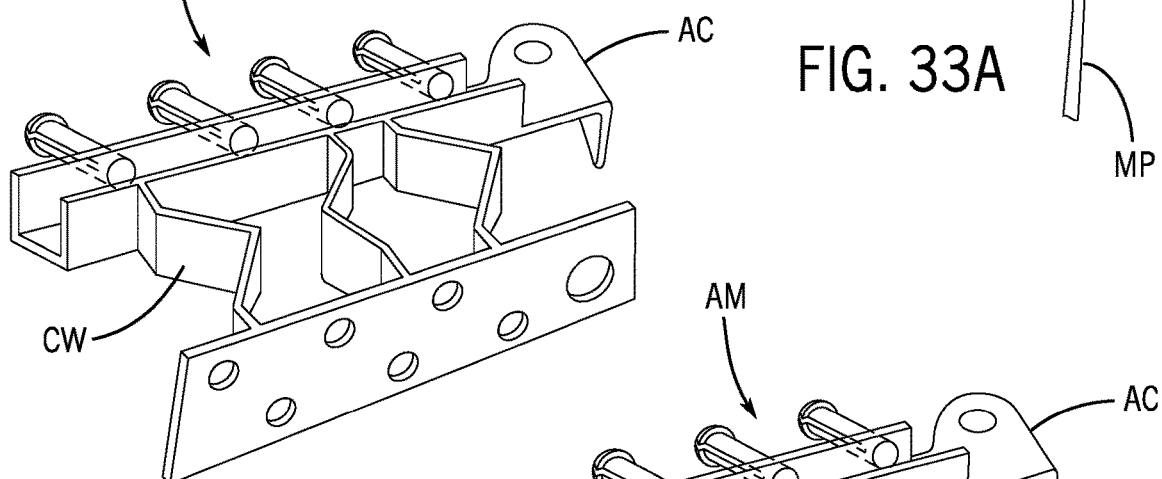

COMPONENT FOR VEHICLE INTERIOR

CROSS-REFERENCE TO RELATED APPLICATIONS

The present application is a continuation of PCT/International Patent Application No. PCT/US21/57115 titled "VEHICLE INTERIOR COMPONENT" filed Oct. 28, 2021, which claims the benefit of U.S. Provisional Patent Application No. 63/107,019 titled "VEHICLE INTERIOR COMPONENT" filed Oct. 29, 2020.

The present application claims priority to and incorporates by reference in full the following patent applications: (a) U.S. Provisional Patent Application No. 63/107,019 titled "VEHICLE INTERIOR COMPONENT" filed Oct. 29, 2020; (b) PCT/International Patent Application No. PCT/US21/57115 titled "VEHICLE INTERIOR COMPONENT" filed Oct. 28, 2021.

FIELD

The present invention relates to a vehicle interior component.

The present invention also relates to vehicle interior component configured for response in event of a side impact.

BACKGROUND

It is known to provide a vehicle interior component such as a door panel with an armrest configured for response in event of a side impact.

It would be advantageous to provide an improved vehicle interior component such as a door panel with an armrest assembly configured for response in event of a side impact.

It would be advantageous to provide an improved vehicle interior component such as a door panel with an armrest assembly comprising a base section and an armrest section configured for response in event of a side impact.

It would be advantageous to provide an improved vehicle interior component such as a door panel with an armrest assembly comprising a base section and an armrest section with a carrier/mechanism configured for response in event of a side impact.

It would be advantageous to provide an improved vehicle interior component such as a door panel with an armrest assembly comprising a base section and an armrest section with a carrier/mechanism configured for response such as movement and/or deformation in event of a side impact.

SUMMARY

The present invention relates to a component for an interior of a vehicle configured to be provided adjacent to a seat for an occupant and for response in an event such as a side impact of the vehicle comprising a door panel and an armrest assembly on the door panel. The armrest assembly may comprise a base section and an armrest section. The armrest assembly may comprise a region configured for response in the event of the side impact at the door panel. Response in the event of the side impact at the door panel may be configured to comprise movement of the armrest section. Movement of the armrest section in the event of the side impact at the door panel may be configured to comprise movement of the armrest section relative to the base section to at least partially cover the base section. Movement of the armrest section may comprise at least one of (a) sliding movement; (b) conversion of force into a translation movement relative to the door panel. The armrest assembly may comprise a mechanism configured to attach the armrest section to the door panel; the mechanism may comprise a set of slots and a set of pins movable within the set of slots so that response in the event of the side impact at the door panel may comprise movement of the set of pins within the set of slots to provide for movement of the armrest section relative to the base section. Response at the armrest assembly in the event of the side impact at the door panel may comprise movement of the armrest section to at least partially shield the occupant from an edge of the base section. The door panel may comprise an integrated carrier configured to attach the armrest section to the door panel; the carrier may be configured to guide movement of the armrest section while maintaining the armrest section attached to the door panel. The armrest assembly may comprise a carrier configured to attach the armrest section to the door panel. Response in the event of the side impact at the door panel may be configured to comprise movement of the armrest section relative to the carrier. The armrest section may be coupled to the carrier by a mechanism configured to allow for movement of the armrest section relative to the carrier; the mechanism may comprise a set of slots and a set of pins movable within the set of slots so that response in the event of the side impact at the door panel may comprise movement of the set of pins within the set of slots to provide for movement of the armrest section relative to the carrier. The set of slots may be provided on the carrier. The carrier may comprise the region of the armrest assembly. The armrest assembly may comprise a carrier to attach the armrest section to the door panel; the carrier may comprise the region of the armrest assembly; the region may comprise a deformable region. The deformable region may comprise a structure on the carrier. The deformable region may comprise a web. The deformable region may comprise a web on the carrier. Movement of the base section in the event of the side impact at the door panel may be configured to comprise movement of the base section relative to the armrest section to at least partially cover the armrest section.

The present invention relates to a component for an interior of a vehicle configured to be provided adjacent to a seat for a vehicle occupant and for response in an event such as a side impact of the vehicle comprising a door panel, an armrest assembly on the door panel, and a compartment on the door panel. The armrest assembly may comprise a base section and an armrest section and a carrier configured to attach the armrest section to the door panel. The armrest assembly may comprise a deformable region configured to deform in response in the event of the side impact at the door panel. The armrest assembly may comprise a mechanism configured to deform in response in the event of the side impact at the door panel. In response in the event of the side impact at the door panel the armrest section may be configured for movement relative to the base section. Movement of the armrest section relative to the base section in the event of the side impact at the door panel may comprise translation at the mechanism so that the armrest section at least partially covers the base section. In response in the event of the side impact the armrest assembly may be configured to at least partially absorb force at the door panel. The mechanism may comprise a set of slots and a set of pins movable within the set of slots. The carrier may comprise the set of slots of the mechanism. The mechanism may be configured to attach the armrest section to the carrier.

The present invention relates to a component for an interior of a vehicle configured to be provided adjacent to a seat for an occupant and for response in an event such as a side impact of the vehicle comprising a door panel and an armrest assembly on the door panel. The armrest assembly may comprise a base section and an armrest section. The armrest assembly may comprise a region configured for response in the event of the side impact at the door panel. Response in the event of the side impact at the door panel may be configured to comprise movement of the armrest section. Movement of the armrest section in the event of the side impact at the door panel may be configured to comprise movement of the armrest section relative to the base section to at least partially cover the base section. Movement of the armrest section may comprise sliding movement. The armrest assembly may be configured to at least partially absorb force at the door panel. Movement of the armrest section may comprise deformation in response to the event of the side impact. Movement of the armrest section may comprise movement of a crash structure of the armrest section. The armrest assembly may be configured to at least partially absorb force. Movement of the armrest section may comprise conversion of force into a translation movement relative to the door panel. The armrest assembly may be configured to at least partially reduce tension to reduce the likelihood of breakage of the armrest assembly in the event of the side impact. The armrest assembly may be configured to at least partially reduce tension by movement of the armrest section relative to the base section to reduce the likelihood of breakage of the armrest assembly in the event of the side impact. The region of the armrest assembly may be configured to be at least partially aligned with the occupant in the seat of the vehicle. The armrest assembly may comprise a mechanism configured to attach the armrest section to the door panel. The mechanism may comprise a set of slots and a set of pins movable within the set of slots so that response in the event of the side impact at the door panel may comprise movement of the set of pins within the set of slots to provide for movement of the armrest section relative to the base section. The mechanism may be configured to at least partially absorb force at the door panel in response in the event of the side impact at the door panel. Response at the armrest assembly in the event of the side impact at the door panel may comprise movement of the armrest section to at least partially shield the occupant from an edge of the base section. The door panel may comprise an integrated carrier configured to attach the armrest section to the door panel. The carrier may be configured to guide movement of the armrest section while maintaining the armrest section attached to the door panel. The armrest assembly may comprise a carrier configured to attach the armrest section to the door panel. Response in the event of the side impact at the door panel may be configured to comprise movement of the armrest section relative to the carrier. The armrest section may be coupled to the carrier by a mechanism configured to allow for movement of the armrest section relative to the carrier. The mechanism may comprise a set of slots and a set of pins movable within the set of slots so that response in the event of the side impact at the door panel may comprise movement of the set of pins within the set of slots to provide for movement of the armrest section relative to the carrier. The set of slots may be provided on the carrier. The carrier may comprise the region of the armrest assembly. Movement of the armrest section may be configured to comprise translation relative to the door panel. Movement of the armrest section may be configured to comprise a deformation. The armrest section may comprise the region of the armrest assembly. The region of armrest assembly may comprise a deformable region. The armrest section may comprise the deformable region. The deformable region may comprise a structure. The deformable region may comprise a structure of the armrest section. The armrest assembly further may comprise a carrier to attach the armrest section to the door panel. The carrier may comprise the region of the armrest assembly. The region may comprise a deformable region. The deformable region may comprise a structure on the carrier. The deformable region may comprise a web. The deformable region may comprise a web on the carrier. The deformable region may comprise a structure on the armrest section of the armrest assembly. The region of the armrest assembly may be configured to be at least partially aligned at an elbow of the occupant in the seat of the vehicle. The region of the armrest assembly may be configured to be at least partially aligned above a hip of the occupant in the seat of the vehicle. The armrest section may comprise a cover. The cover of the armrest section may comprise a pad. The component may comprise a compartment on the door panel. The compartment may comprise a map pocket assembly comprising a cover and a carrier configured to at least partially absorb impact in response to the event of the side impact at the door panel. The compartment may be configured to be at least partially aligned with the occupant in the seat of the vehicle. The compartment may be configured to be at least partially aligned with a hip of the occupant in the seat of the vehicle. Movement of the base section in the event of the side impact at the door panel may be configured to comprise movement of the base section relative to the armrest section to at least partially cover the armrest section.

The present invention relates to a component for an interior of a vehicle configured to be provided adjacent to a seat for an occupant and for response in an event such as a side impact of the vehicle comprising a door panel and an armrest assembly on the door panel. The armrest assembly may comprise a base section and an armrest section. The armrest assembly may comprise a region configured for response in the event of the side impact at the door panel. Response in the event of the side impact at the door panel may be configured to comprise movement of the base section. Movement of the base section in the event of the side impact at the door panel may be configured to comprise movement of the base section relative to the armrest section to at least partially cover the armrest section. The base section of the armrest assembly may comprise a frame and a cover; the armrest section of the armrest assembly may comprise a structure and a cover. The structure of the armrest section may be configured to move over the frame of the base section in the event of the side impact at the door panel. The armrest section of the armrest assembly may comprise a structure and a deformable pad.

The present invention relates to a component for an interior of a vehicle configured to be provided adjacent to a seat for an occupant and for response in an event such as a side impact of the vehicle comprising a door panel and an armrest assembly on the door panel. The armrest assembly may comprise a base section and an armrest section. The armrest assembly may comprise a region configured for response in the event of the side impact at the door panel. Response in the event of the side impact at the door panel may be configured to comprise movement of the base section. Movement of the base section in the event of the side impact at the door panel may be configured to comprise movement of the base section relative to the armrest section and deformation at the region. The region may comprise a deformable structure on the armrest section. The component may comprise a carrier configured to connect the armrest section to the door panel; the region may comprise a deformable structure on the carrier.

The present invention relates to a component for an interior of a vehicle configured to be provided adjacent to a seat for a vehicle occupant and for response in an event such as a side impact of the vehicle comprising a door panel, an armrest assembly on the door panel and a compartment on the door panel. The armrest assembly may comprise a base section and an armrest section and a carrier configured to attach the armrest section to the door panel. The armrest assembly may comprise a deformable region configured to deform in response in the event of the side impact at the door panel. The armrest assembly may comprise a mechanism configured to deform in response in the event of the side impact at the door panel. In response in the event of the side impact at the door panel the armrest section may be configured for movement relative to the base section. Movement of the armrest section relative to the base section in the event of the side impact at the door panel may comprise translation at the mechanism so that the armrest section at least partially covers the base section. In response in the event of the side impact the armrest assembly may be configured to at least partially absorb force at the door panel. The mechanism may comprise a set of slots and a set of pins movable within the set of slots. The carrier may comprise the set of slots of the mechanism. The mechanism may be configured to attach the armrest section to the carrier. The deformable region may comprise a structure on the armrest section of the armrest assembly. The armrest section may comprise a cover. The cover of the armrest section may comprise a pad.

The present invention relates to a vehicle interior component. The component may comprise a trim panel. The component may comprise a main carrier and at least two segments. The segments may be coupled by at least one protrusion. A first segment may comprise an armrest carrier and a second segment may comprise a switch panel carrier or structural component. The switch panel carrier may be firmly coupled to the main carrier. The switch panel carrier may comprise a flexible extension. The flexible extension may be coupled to the armrest carrier. The armrest carrier may be movably coupled to the main carrier by means of a mounting. The mounting may comprise a frame, at least one flexible rib and at least one slotted hole. The mounting may comprise an interconnection of a door panel carrier and an armrest carrier. The mounting may be configured to absorb an external force on a door (e.g. in case of a side impact event). The mounting may be integrated into the door panel carrier.

FIGURES

FIG. 13A is a schematic perspective view of a vehicle interior component according to an exemplary embodiment.

FIG. 13B is a schematic partial plan view of a vehicle interior component according to an exemplary embodiment.

FIG. 13C is a schematic cutaway plan view of a vehicle interior component according to an exemplary embodiment.

FIG. 14A is a schematic perspective view of a vehicle interior component according to an exemplary embodiment.

FIG. 14B is a schematic partial plan view of a vehicle interior component according to an exemplary embodiment.

FIG. 14C is a schematic cutaway plan view of a vehicle interior component according to an exemplary embodiment.

FIG. 15A is a schematic perspective view of a vehicle interior component according to an exemplary embodiment.

FIG. 15B is a schematic partial plan view of a vehicle interior component according to an exemplary embodiment.

FIG. 15C is a schematic cutaway plan view of a vehicle interior component according to an exemplary embodiment.

FIG. 16A is a schematic perspective view of a vehicle interior component according to an exemplary embodiment.

FIG. 16B is a schematic exploded perspective view of a vehicle interior component according to an exemplary embodiment.

FIG. 17 is a schematic partial perspective view of a vehicle interior component according to an exemplary embodiment.

FIGS. 18A to 18B are schematic partial perspective views of a vehicle interior component according to an exemplary embodiment.

FIGS. 19A to 19B are schematic partial perspective views of a vehicle interior component according to an exemplary embodiment.

FIG. 22 is a schematic partial exploded perspective view of a vehicle interior component according to an exemplary embodiment.

FIGS. 22A to 22F are schematic cutaway perspective views of a vehicle interior component according to an exemplary embodiment.

FIG. 29 is a schematic partial perspective view of a vehicle interior component according to an exemplary embodiment.

FIG. 30A is a schematic partial section view of a vehicle interior component according to an exemplary embodiment.

FIG. 30B is a schematic cutaway section view of a vehicle interior component according to an exemplary embodiment.

FIG. 31A is a schematic partial section view of a vehicle interior component according to an exemplary embodiment.

FIG. 31B to 31C are schematic cutaway section views of a vehicle interior component according to an exemplary embodiment.

FIG. 32A is a schematic partial section view of a vehicle interior component according to an exemplary embodiment.

FIG. 32B is a schematic partial perspective view of a vehicle interior component according to an exemplary embodiment.

FIG. 33A is a schematic partial section view of a vehicle interior component according to an exemplary embodiment.

FIG. 33B is a schematic cutaway perspective view of a vehicle interior component according to an exemplary embodiment.

DESCRIPTION

Figure 1:
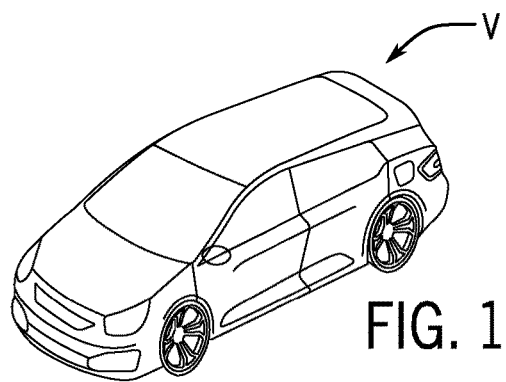
FIG. 1 is a schematic perspective view of a vehicle according to an exemplary embodiment.
Figure 2:
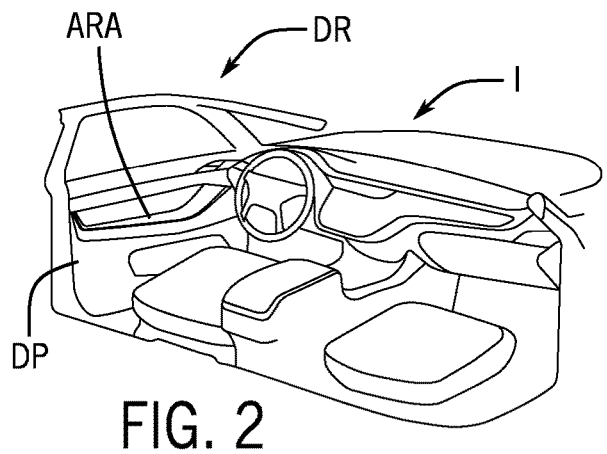
FIG. 2 is a schematic perspective cut-away view of the vehicle showing a vehicle interior according to an exemplary embodiment.
Figure 3A:
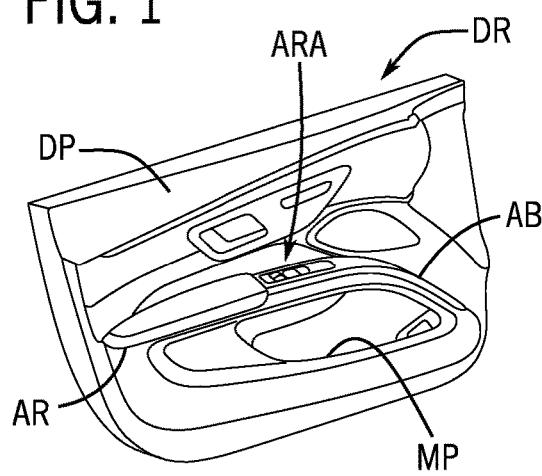
FIGS. 3A to 3B are schematic perspective views of a vehicle interior component according to an exemplary embodiment.
Figure 3B:
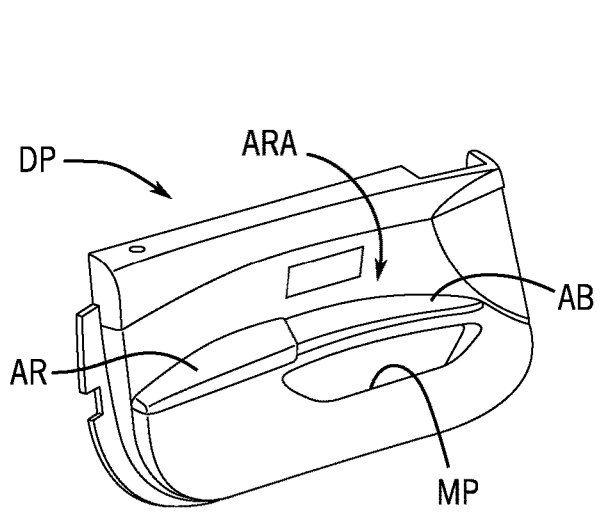
Figure 4A:
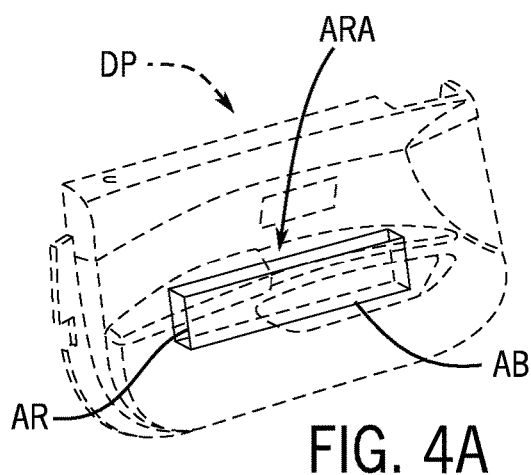
FIG. 4A is a schematic perspective view of a vehicle interior component according to an exemplary embodiment.
Figure 4B:
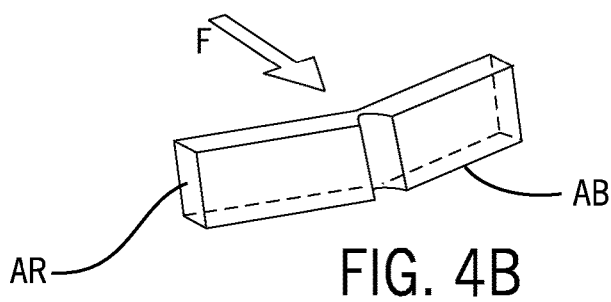
FIG. 4B is a schematic perspective cutaway view of a vehicle interior component according to an exemplary embodiment.
Figure 5A:
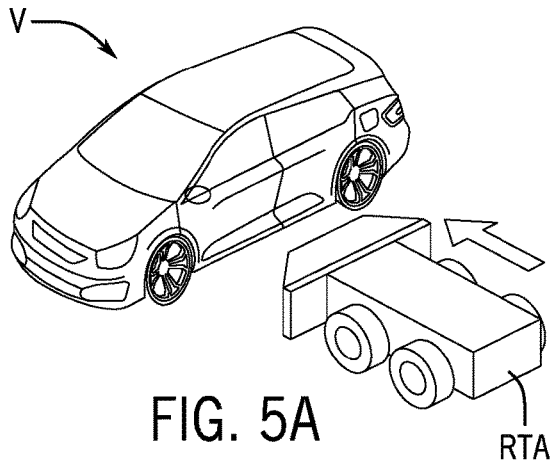
FIGS. 5A to 5B are schematic perspective views of a vehicle according to an exemplary embodiment.
Figure 5B:
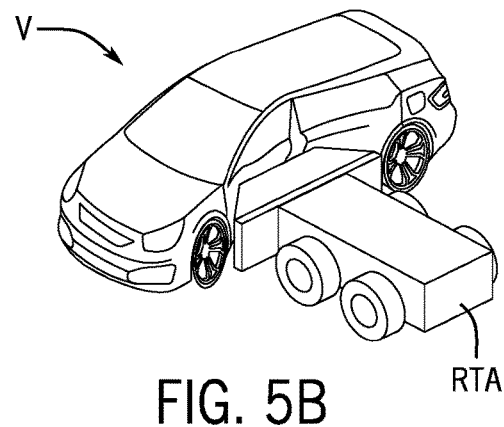
Figure 6A:
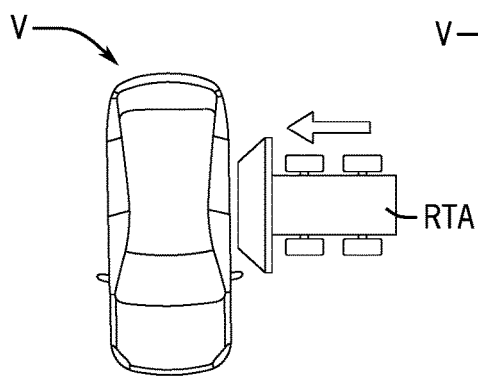
FIGS. 6A to 6B are schematic plan views of a vehicle according to an exemplary embodiment.
Figure 6B:
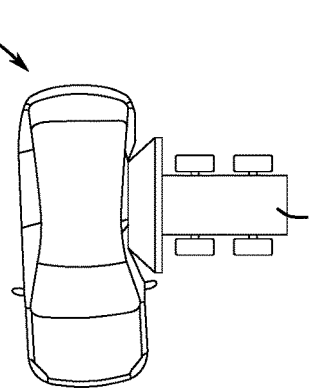
Figure 8:
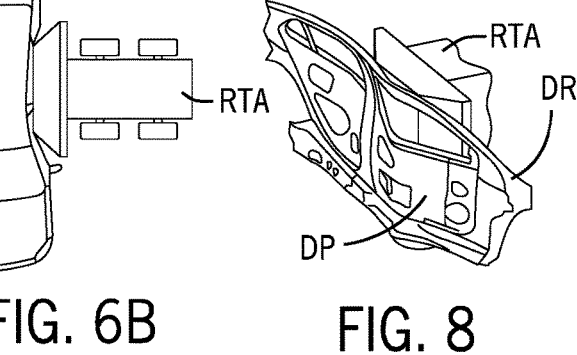
FIG. 8 is a schematic perspective cutaway view of a vehicle interior component according to an exemplary embodiment.
Figure 7A:
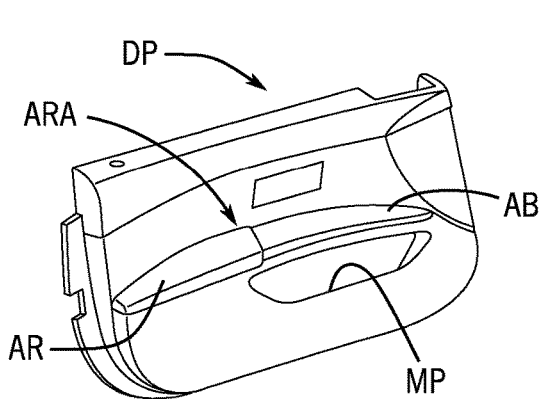
FIGS. 7A to 7B are schematic perspective views of a vehicle interior component according to an exemplary embodiment.
Figure 7B:
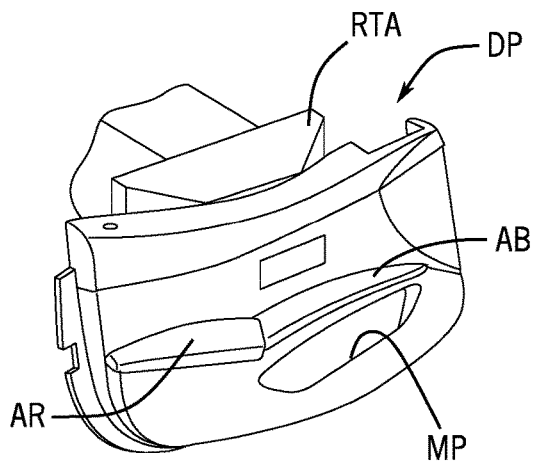
Figures 9A, 9B:
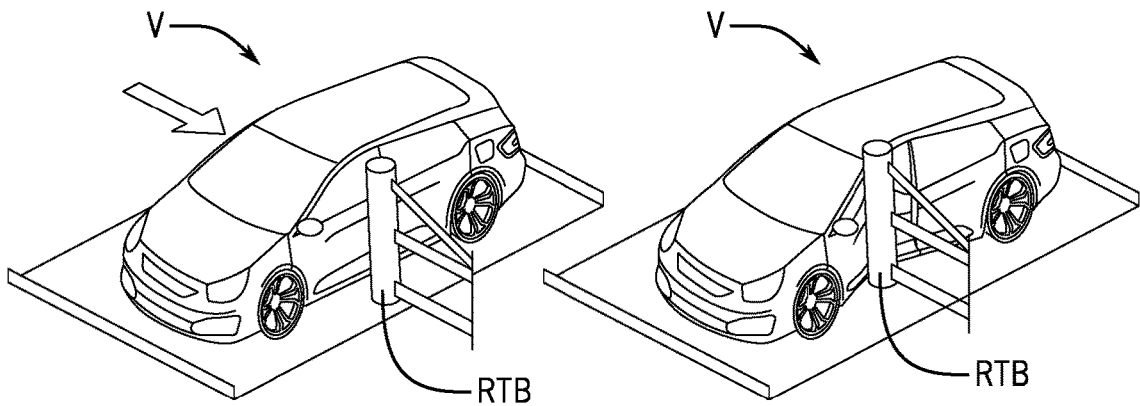
FIGS. 9A to 9B are schematic perspective views of a vehicle according to an exemplary embodiment.
Figures 10A, 10B, 12:
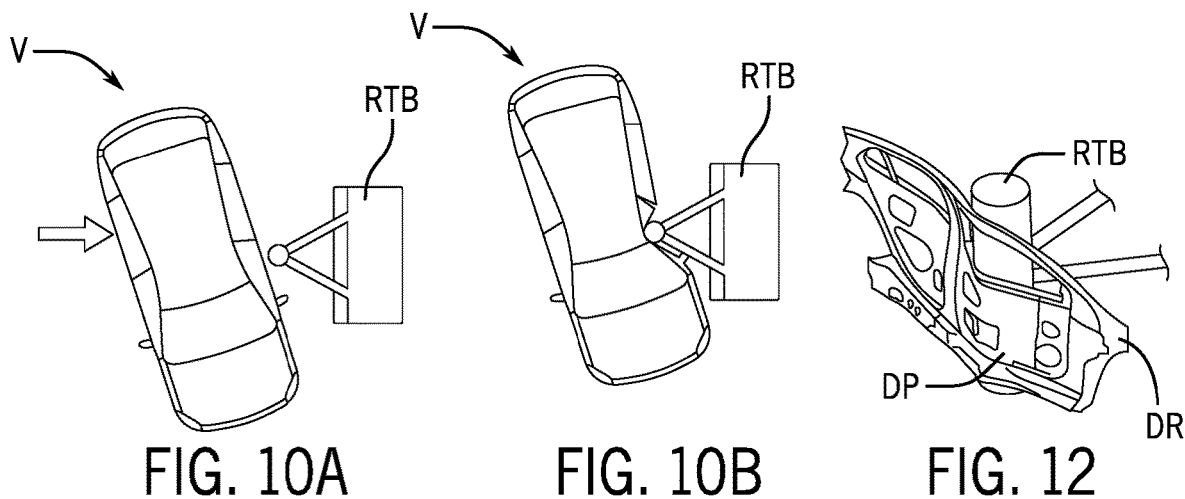
FIGS. 10A to 10B are schematic plan views of a vehicle according to an exemplary embodiment.
FIG. 12 is a schematic perspective cutaway view of a vehicle interior component according to an exemplary embodiment.
Figures 11A, 11B:
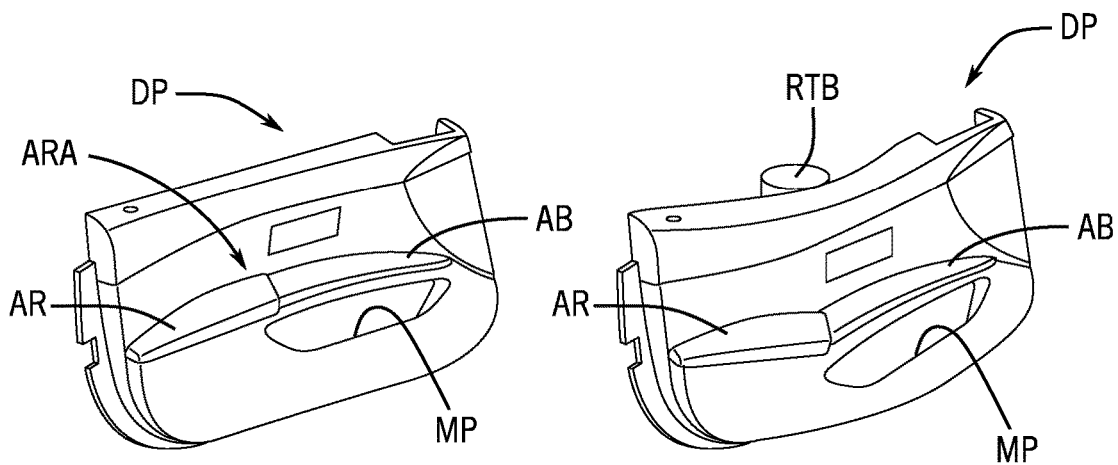
FIGS. 11A to 11B are schematic perspective views of a vehicle interior component according to an exemplary embodiment.
Figure 16C:
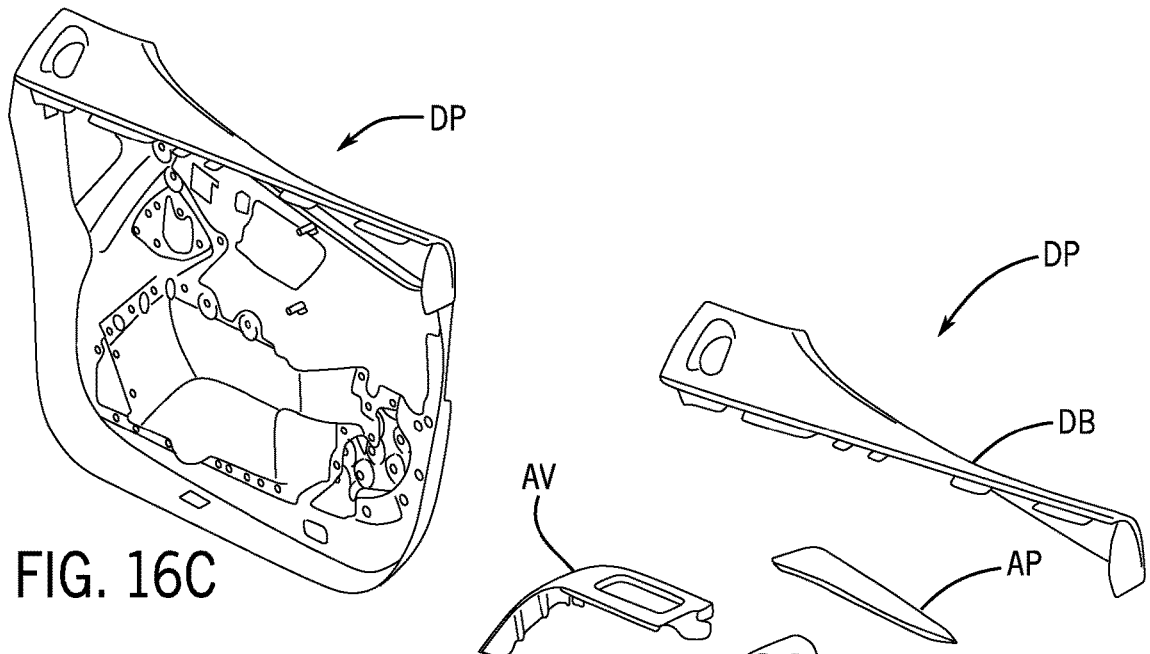
FIG. 16C is a schematic perspective view of a vehicle interior component according to an exemplary embodiment.
Figure 16D:
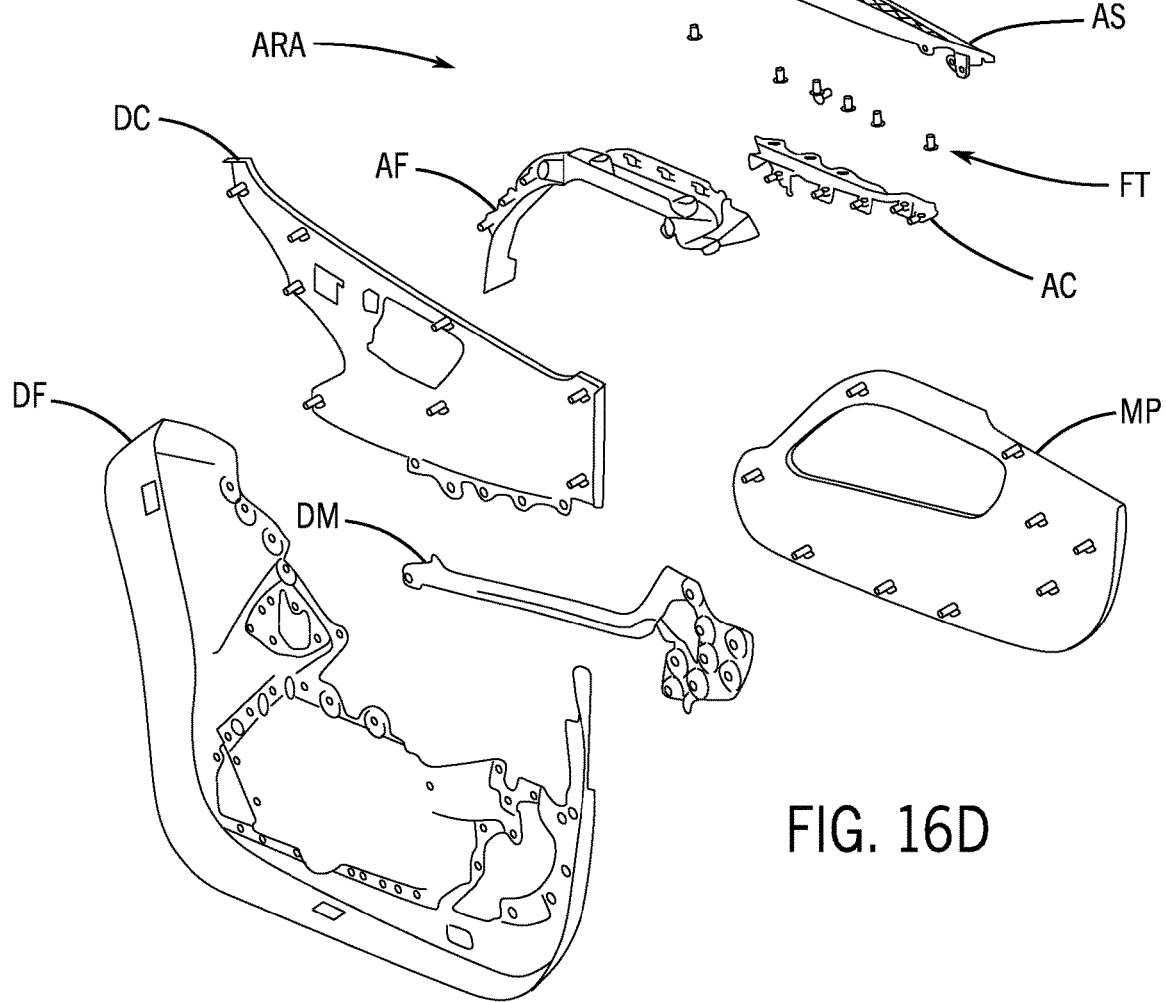
FIG. 16D is a schematic exploded perspective view of a vehicle interior component according to an exemplary embodiment.

Referring to FIGS. 1 and 2 a vehicle V providing an interior I is shown according to an exemplary embodiment. Vehicle interior I may comprise interior components including a door panel DP for a door DR. As shown schematically in FIGS. 2 and 3A-3B, door panel DP may provide an armrest assembly ARA comprising a base section AB and an armrest section AR; door panel DP may also provide a map pocket assembly MP. See also FIGS. 16A-16D.

As indicated schematically in FIGS. 3A-3B and 4A-4B, door panel DP may be subjected to a force F such as in the event of side impact of the vehicle. See also FIGS. 5A-5B, 6A-6B, 9A-9B and 10A-10B. As shown schematically in FIGS. 4A and 4B, force F may act upon armrest assembly ARA and cause a response at armrest section AR and base section AB. See also FIGS. 5A-5B, 6A-6B, 7A-7B, 8, 9A-9B, 10A-10B, 11A-11B, 12, 13A-13C, 14A-14C and 15A-15C. As indicated schematically in FIGS. 2, 13B-13C, 14B-14C and 15B-15C, an occupant may be seated adjacent to door panel DP and armrest assembly ARA with armrest section AR and base section AB.

As shown schematically in FIGS. 5A-5B, 6A-6B, 7A-7B, 8, 9A-9B, 10A-10B, 11A-11B and 12, the effect of an event of a side impact on vehicle V at door panel DP with armrest assembly ARA may be shown using a test fixture such as crash barrier RTA or crash barrier RTB; as indicated schematically, impact of vehicle V with crash barrier RTA/RTB may produce a response at armrest assembly ARA.

According to an exemplary embodiment as indicated schematically in FIGS. 7A-7B, 11A-11B, 13A-13C, 14A-14C and 15A-15C, the armrest assembly may comprise a base section and an armrest section and a region configured for response to side impact at the door panel; the region may comprise a movable/deformable structure; response of the armrest assembly may comprise deformation to partially absorb force and/or movement of the armrest section relative to the base section to partially cover the base section. See also FIGS. 18A-18B and 19A-19B.

As indicated schematically in FIGS. 4A-4B, 13A-13C and 14A-14C, the armrest assembly may provide an armrest section and a base section that separate and that may each contact a vehicle operator VO in the event of a side impact at door panel DP.

As indicated schematically according to an exemplary embodiment in FIGS. 7A-7B, 11A-11B, 13A-13C and 15A-15C, the armrest assembly may provide an armrest section and a base section that may be configured to move and/or deform to absorb force and to shield/deflect contact with vehicle operator VO in response in the event of a side impact at door panel DP. See also FIGS. 23, 28A-28F and 29.

As shown schematically according to an exemplary embodiment in FIGS. 15A-15C and 16A, door panel DP may comprise armrest assembly ARA comprising armrest section AR and base section AB with a map pocket assembly MP and with a handle GH and a switch panel SP for the vehicle operator. As shown schematically in FIGS. 16A-16D, door panel DP may be assembled onto a door frame DF with a door panel part/bolster DB and door cover DC and with armrest assembly ARA comprising armrest section AR and base section AB and with map pocket/assembly MP; armrest section AR may comprise a structure AS with carrier AC and a cover AP; base section AB may comprise a frame AF and a cover AV; fasteners FT may be provided to attach structure AS to carrier AC and/or to frame AF and/or to the door panel/parts. See also FIGS. 17, 23, 28A-28F and 29. As shown schematically in FIGS. 16C-16D, map pocket/assembly MP may be coupled to door panel DP with a structure DM (e.g. connector, force-absorbing structure, etc.).

Figure 20:
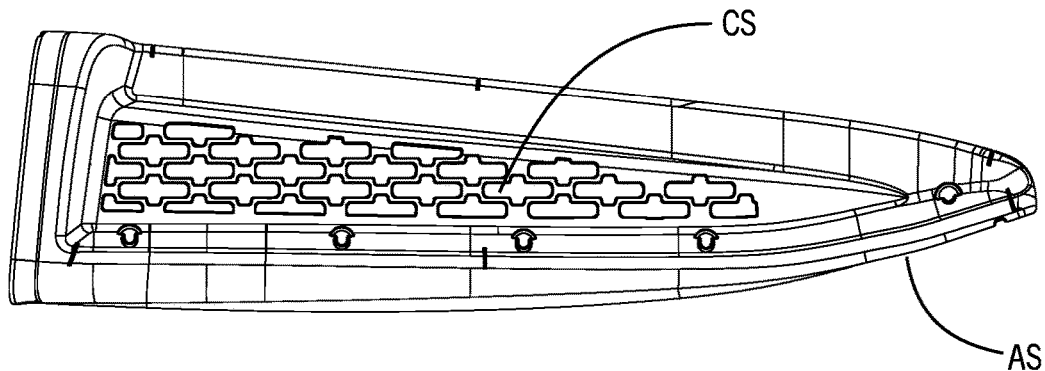
FIG. 20 is a schematic partial perspective view of a vehicle interior component according to an exemplary embodiment.
Figure 20A:
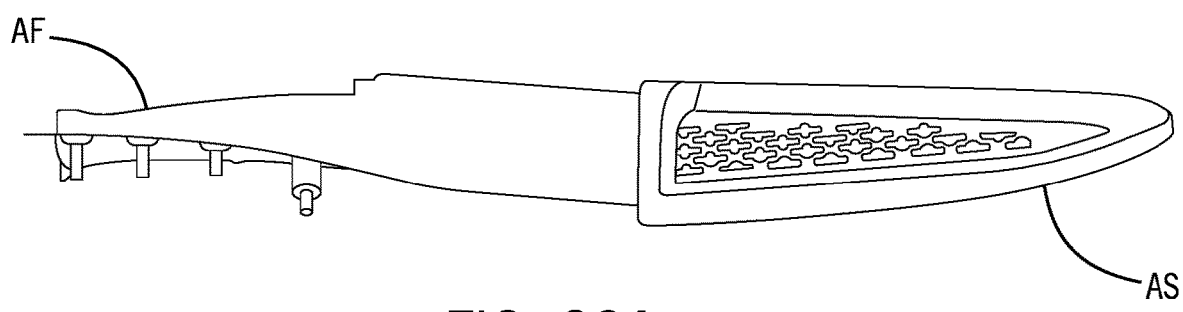
FIGS. 20A to 20C are schematic partial perspective views of a vehicle interior component according to an exemplary embodiment.
Figure 20B:
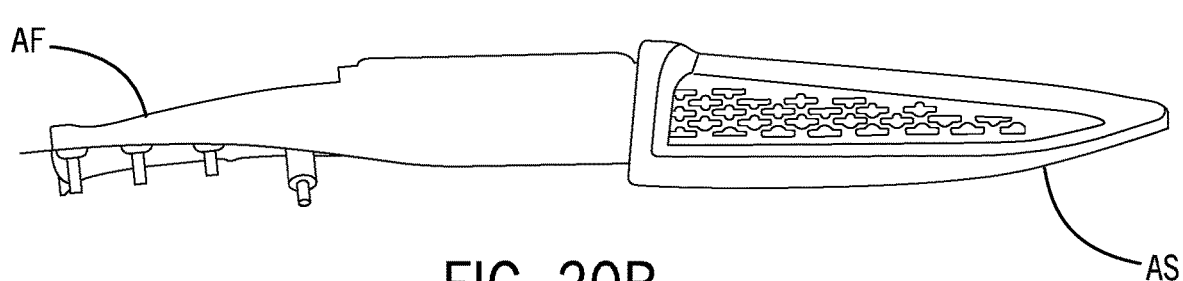
Figure 20C:
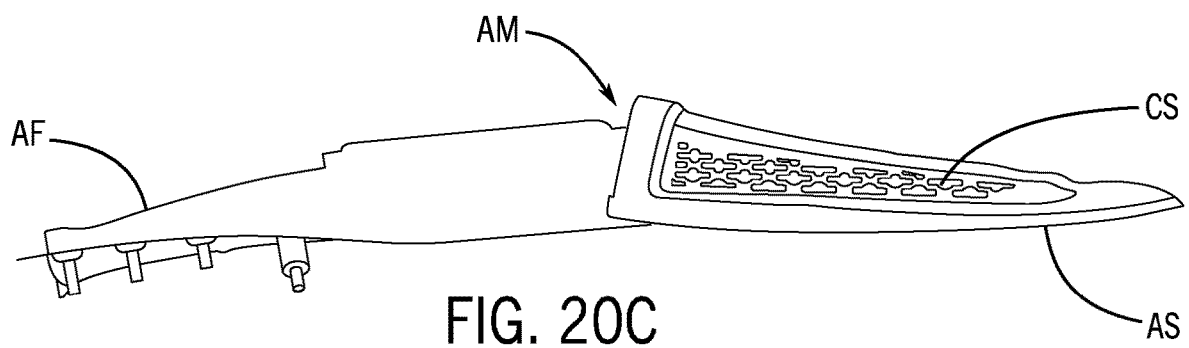
Figure 21:
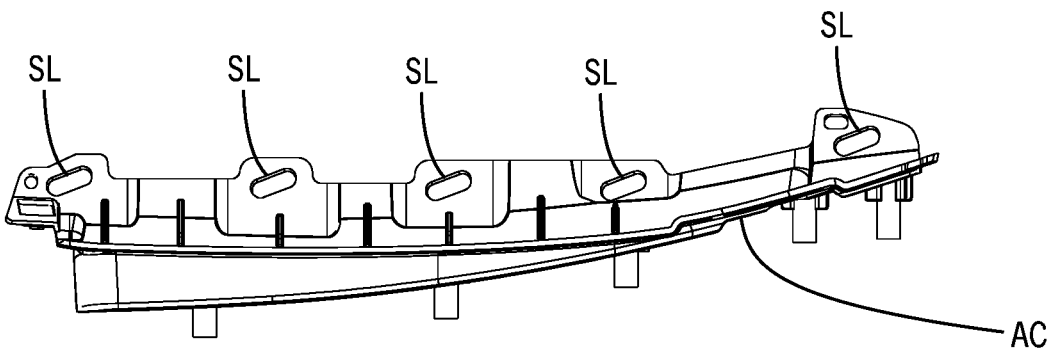
FIG. 21 is a schematic partial perspective view of a vehicle interior component according to an exemplary embodiment.
Figure 21A:
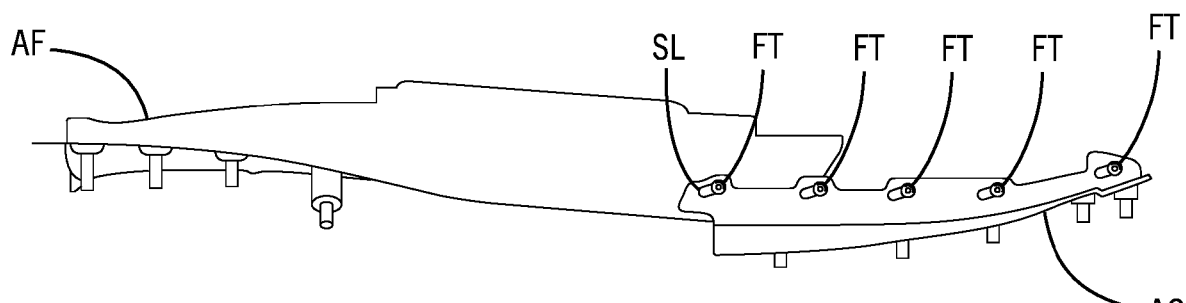
FIGS. 21A to 21C are schematic partial perspective views of a vehicle interior component according to an exemplary embodiment.
Figure 21B:
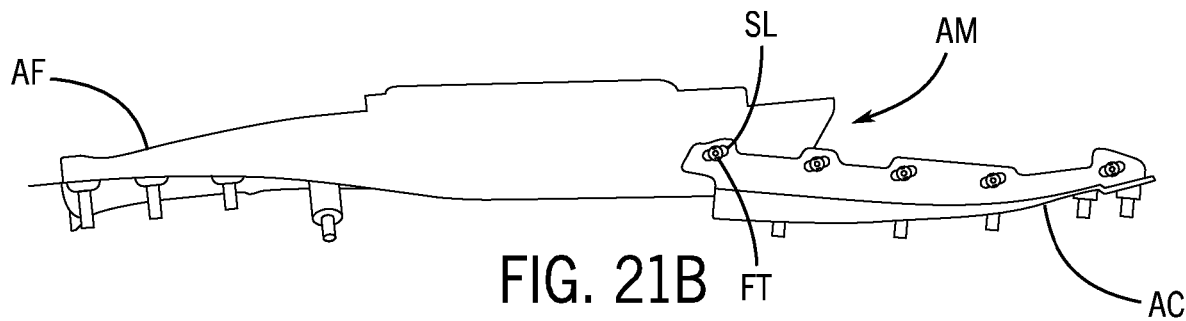
Figure 21C:
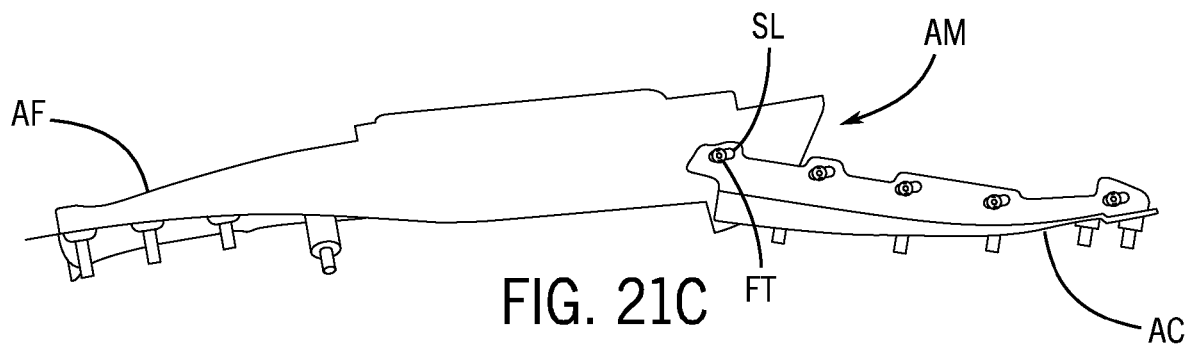
Figure 23:
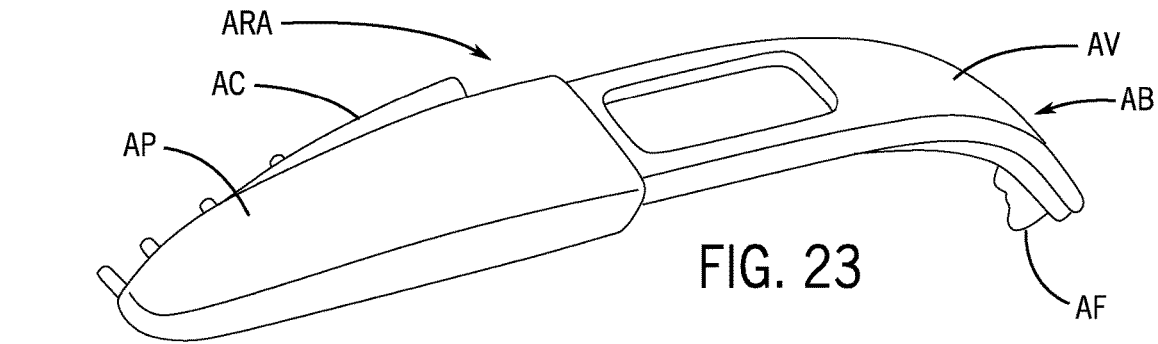
FIG. 23 is a schematic partial perspective view of a vehicle interior component according to an exemplary embodiment.
Figure 24A:
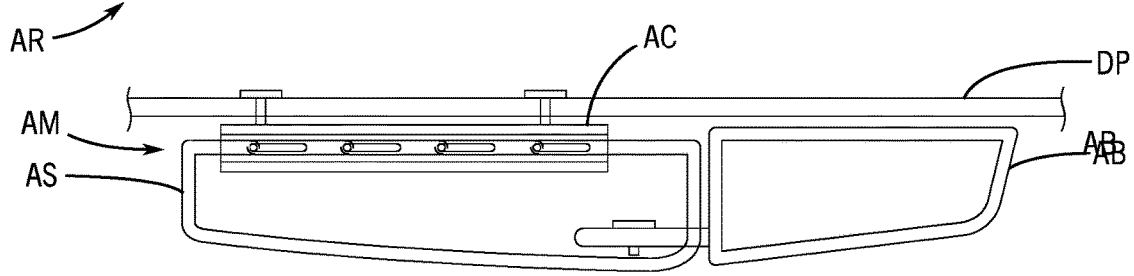
FIG. 24A is a schematic partial section view of a vehicle interior component according to an exemplary embodiment.
Figure 24B:
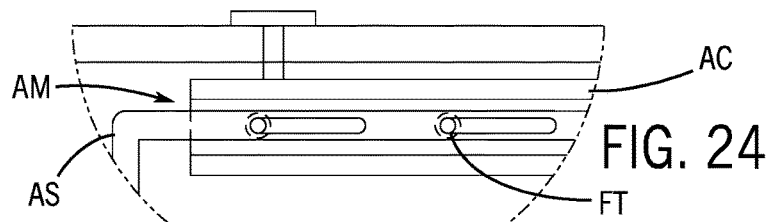
FIG. 24B is a schematic cutaway section view of a vehicle interior component according to an exemplary embodiment.
Figure 25A:
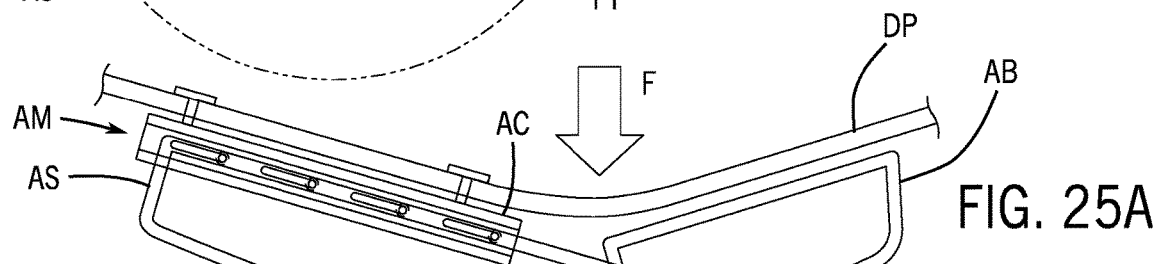
FIG. 25A is a schematic partial section view of a vehicle interior component according to an exemplary embodiment.
Figure 25B:
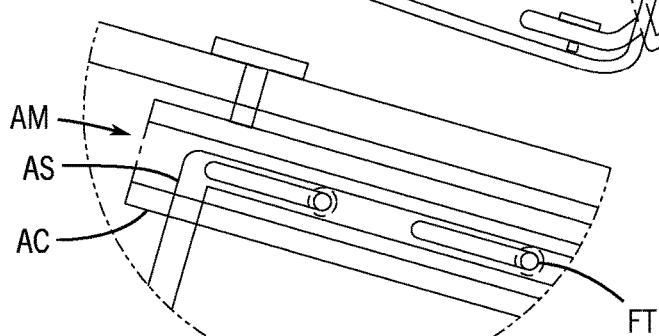
FIG. 25B to 25C are schematic cutaway section views of a vehicle interior component according to an exemplary embodiment.
Figure 25C:
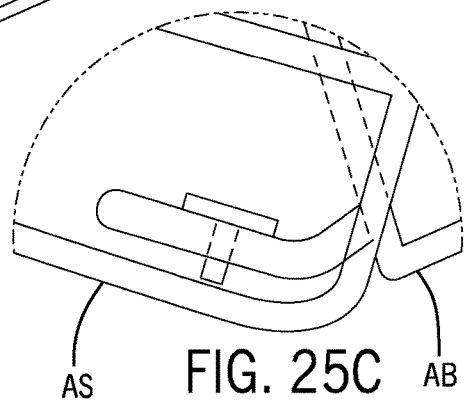
Figure 26A:
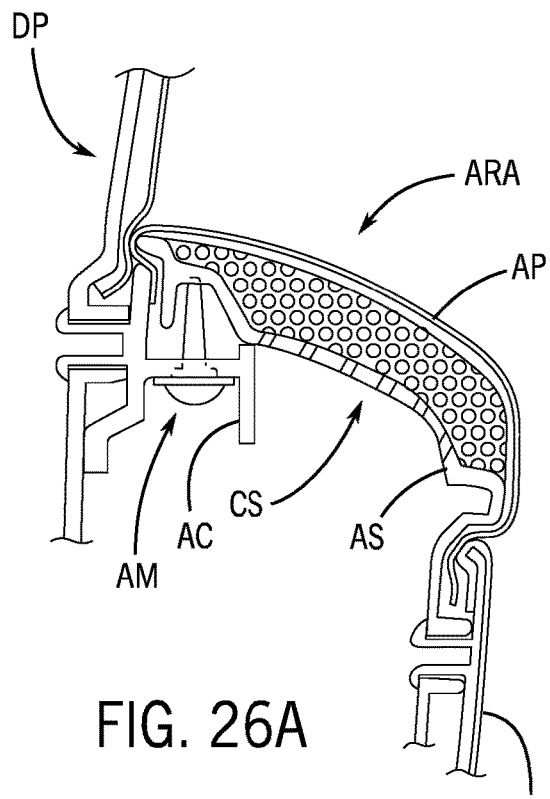
FIG. 26A is a schematic partial section view of a vehicle interior component according to an exemplary embodiment.
Figure 27A:
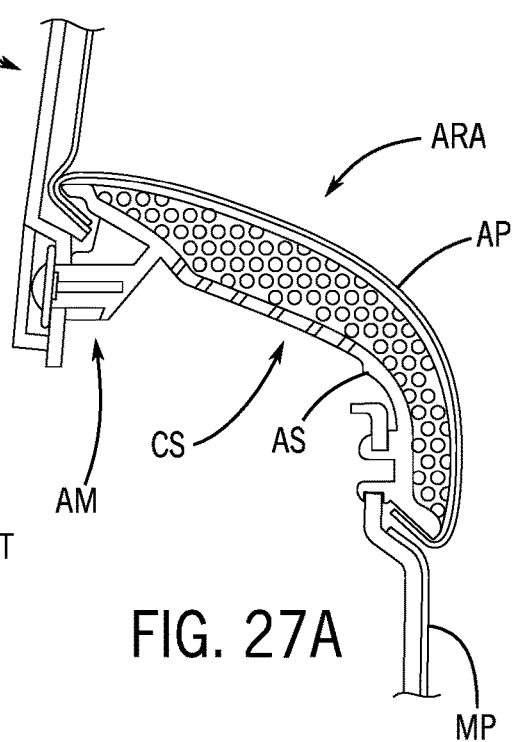
FIG. 27A is a schematic partial section view of a vehicle interior component according to an exemplary embodiment.
Figure 26B:
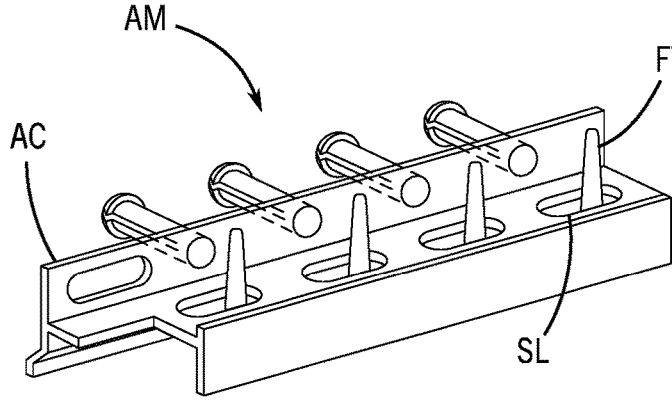
FIG. 26B is a schematic partial perspective view of a vehicle interior component according to an exemplary embodiment.
Figure 27B:
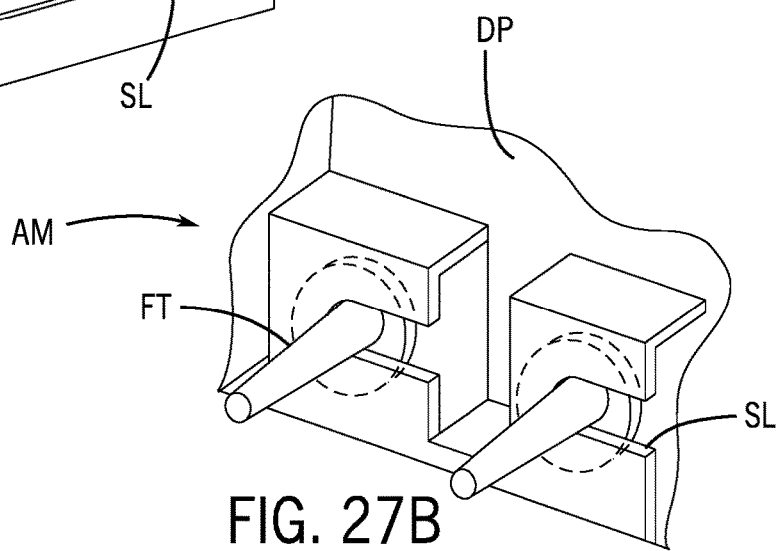
FIG. 27B is a schematic cutaway perspective view of a vehicle interior component according to an exemplary embodiment.
Figure 28A:
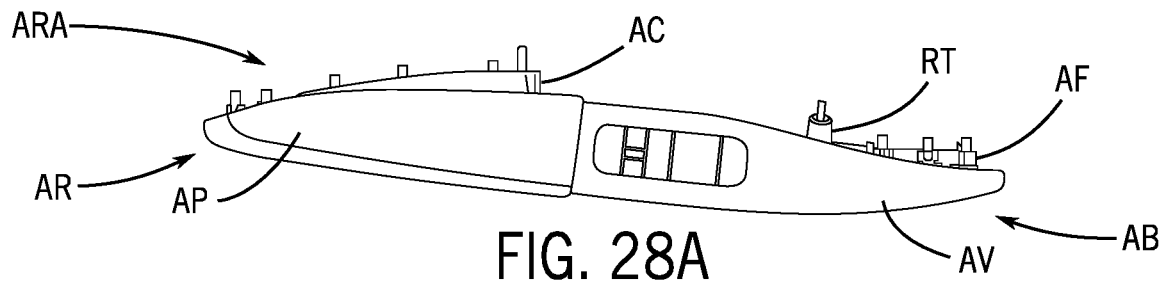
FIG. 28A is a schematic partial plan view of a vehicle interior component according to an exemplary embodiment.
Figure 28B:
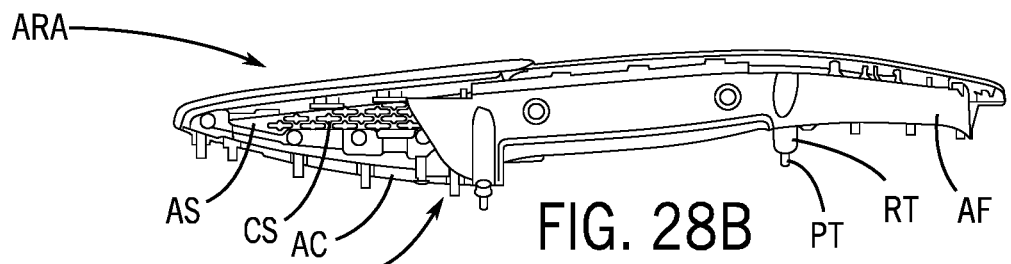
FIG. 28B is a schematic partial side view of a vehicle interior component according to an exemplary embodiment.
Figure 28C:
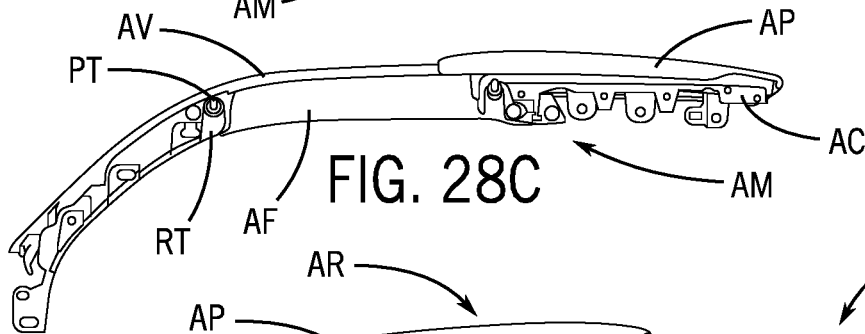
FIGS. 28C to 28F are schematic partial perspective views of a vehicle interior component according to an exemplary embodiment.
Figure 28D:
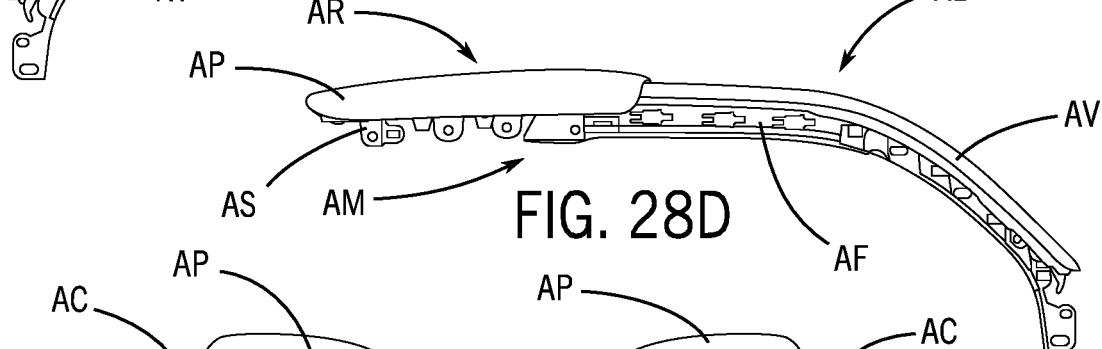
Figure 28E:
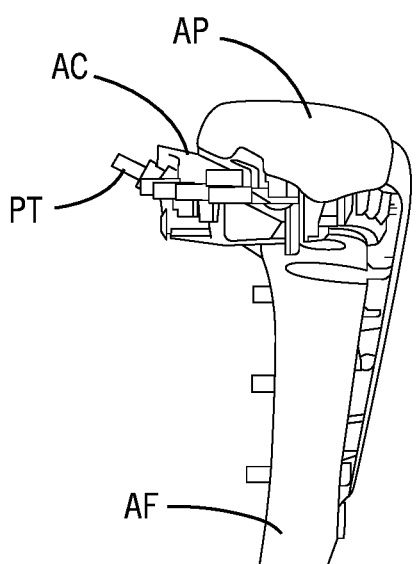
Figure 28F:
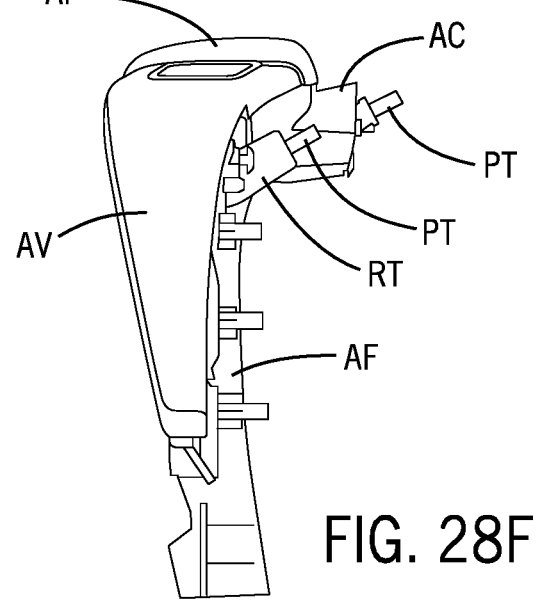

As indicated schematically according to an exemplary embodiment in FIGS. 17, 18A-18B, 19A-19B, 20, 20A-20C, 21, 21A-21C and 22A-22D, armrest assembly ARA may be configured to provide a response to side impact at the door panel by construction of armrest section AR and base section AB (e.g. with movable elements/deformable structures); as indicated schematically, response of armrest section AR and base section AB may comprise deformation of structures and/or relative movement of structures as directed/guided in response to force F applied in the event of a side impact at the door panel. See also FIGS. 7A-7B, 11A-11B, 13A-13C and 15A-15C. As indicated schematically in FIGS. 18A-18B, 20 and 20A-20C, armrest assembly ARA may comprise a carrier AC and/or a mechanism AM to attach structure AS of armrest section AR to door panel DP; carrier AC and/or mechanism AM may be configured to guide/direct movement of the armrest section and/or to partially absorb the side impact force. See also FIGS. 13A-13C, 15A-15C, 22 and 22A-22F. As indicated schematically in FIGS. 18A-18B, 20 and 20A-20C, structure AS of armrest section AR may comprise a deformable region/section CS; response to the force/impact may comprise deformation of region CS (see FIG. 20C). See also FIGS. 15B-15C (deformation sliding/translating and rotating movement of armrest section AR with base section AB). As indicated schematically in FIGS. 18A-18B, 19A-19B, 20, 20A-20C, 21 and 21A-21C, carrier AC with structure AS of armrest section AR may be configured for directed movement (relative to base section AB); response to the force/impact may comprise movement of armrest section AR by carrier AC with structure AS (see FIGS. 20C and 21C); as indicated schematically, movement of carrier AC/structure AS may be provided at mechanism AM. See also FIGS. 15B-15C (sliding/translating and rotating movement with deformation for armrest section AR with base section AB). As shown schematically in FIGS. 21 and 21A-21C, mechanism AM may comprise a set of pins FP shown as on fasteners FT (with heads FH) movable within a set of slots SL to provide for movement of carrier AC and/or structure AS of armrest section AR. See also FIGS. 15B-15C, 22 and 22F. As indicated schematically in FIGS. 23, 24A-24B and 25A-25C, mechanism AM at carrier AC may be configured to facilitate directed movement of structure AS of armrest section AR by translation of the set of pins of fasteners FT within corresponding slots SL in event of impact shown as force F; directed movement may comprise the relative movement of armrest section AR/structure AS to shield armrest base AB (see FIGS. 25A-25C). See also FIGS. 15A-15C.

As indicated schematically in FIGS. 22 and 22A-22F, frame AF and carrier AC and structure S of the armrest assembly may comprise a variety of mechanical/assembly features configured to facilitate efficient assembly/use and in event of a side impact/force to guide/direct movement of the armrest section and/or to partially absorb the side impact force. See also FIGS. 15A-15C and 28A-28F. As shown in FIG. 22A, a connection/hook feature and post PT with retainer RT may provide an interface for assembly and for directed movement; as shown in FIG. 22B, a post PT with retainer RT and guide on carrier AC may provide an interface for assembly and for directed movement; as shown in FIGS. 22C, 22D and 22E, a fastener FT in slot SL may provide an interface for assembly and for directed movement.

As indicated schematically according to an exemplary embodiment in FIGS. 15A-15C, the armrest assembly may comprise any of a variety of mechanisms such as fastener-slot arrangements, post-retainer arrangements, connectors, etc. See generally FIGS. 21, 21A-21C, 22, 22A-22F, 24A-24B, 25A-25C, 26A-26B, 27A-27B, 28A-28F, 30A-30B, 31A-31C, 32A-32B and 33A-33B. As shown in FIGS. 26A-26B and 27A-27B, the armrest assembly may be configured for attachment of structure AS of armrest section directly to door panel DP; as shown, fasteners FT in slots SL may provide an interface for assembly and for directed movement of the sections of the armrest assembly in event of an impact/force. See FIGS. 15A-15C.

As indicated schematically according to an exemplary embodiment in FIGS. 29, 30A-30B, 31A-31C, 32A-32C and 33A-33B, armrest assembly ARA may be configured to provide a response to side impact at the door panel by construction of armrest section AR and base section AB (e.g. with movable elements/deformable structures); as indicated schematically, response of armrest section AR and base section AB may comprise deformation of structures and/or relative movement of structures as directed/guided in response to force F applied in the event of a side impact at the door panel. See also FIGS. 7A-7B, 11A-11B, 13A-13C and 15A-15C. As indicated schematically in FIGS. 29, 30A-30B, 31A-31C, 32A-32C and 33A-33B, armrest assembly ARA may comprise a carrier AC and/or a mechanism AM to attach structure AS of armrest section AR to door panel DP; carrier AC and/or mechanism AM may be configured to guide/direct movement of the armrest section and/or to partially absorb the side impact force. See also FIGS. 13A-13C and 15A-15C. As indicated schematically in FIGS. 29, 30A-30B and 31A-31C, structure AS of armrest section AR may comprise a deformable region/section shown as a web CW; response to the force/impact may comprise deformation of region CW; as indicated schematically in FIGS. 32A-32B and 33A-33B, carrier AC of armrest section AR may comprise a deformable region/section shown as a web CW; response to the force/impact may comprise deformation of region CW. See also FIGS. 15B-15C (deformation sliding/translating and rotating movement of armrest section AR with base section AB). As indicated schematically in FIGS. 30A-30B and 31A-31C, carrier AC with structure AS of armrest section AR may be configured for directed movement (relative to base section AB); response to the force/impact may comprise movement of armrest section AR by carrier AC with structure AS (see FIGS. 20C and 21C); as indicated schematically, movement of carrier AC/structure AS may be provided at mechanism AM. See also FIGS. 15B-15C (sliding/translating and rotating movement with deformation for armrest section AR with base section AB). As shown schematically in FIGS. 30A-30B and 31A-31C, mechanism AM may comprise a set of pins FP shown as on fasteners FT (with heads FH) movable within a set of slots SL to provide for movement of carrier AC and/or structure AS of armrest section AR. See also FIGS. 15B-15C, 22 and 22F. As indicated schematically in FIGS. 29, 30A-30B and 31A-31C, mechanism AM at carrier AC may be configured to facilitate directed movement of structure AS of armrest section AR by translation of the set of pins of fasteners FT within corresponding slots SL in event of impact shown as force F; directed movement may comprise the relative movement of armrest section AR/structure AS to shield armrest base AB (see FIG. 31C). See also FIGS. 15A-15C.

As indicated schematically according to an exemplary embodiment in FIGS. 32A-32B and 33A-33B, the armrest assembly may comprise any of a variety of arrangements such as with carrier AC comprising a deformable region CW for response to impact/force and connected to structure AS for cover/assembly AP for armrest section AR; as indicated schematically, cover/assembly may comprise a decorative cover over a deformable pad (e.g. foam, etc.). See also FIGS. 26A and 27A.

Exemplary Embodiments—A

According to an exemplary embodiment as shown schematically in FIGS. 2, 7A-7B, 11A-11B, 13A-13C, 15A-15C, 17, 18A-18B, 19A-19B, 20A-20C, 21A-21C, 24A-24B, 25A-25C, 30A-30B and 31A-31C, a component for an interior of a vehicle configured to be provided adjacent to a seat for an occupant and for response in an event such as a side impact of the vehicle may comprise a door panel and an armrest assembly on the door panel. The armrest assembly may comprise a base section and an armrest section. The armrest assembly may comprise a region configured for response in the event of the side impact at the door panel. Response in the event of the side impact at the door panel may be configured to comprise movement of the armrest section. Movement of the armrest section in the event of the side impact at the door panel may be configured to comprise movement of the armrest section relative to the base section to at least partially cover the base section. Movement of the armrest section may comprise sliding movement. The armrest assembly may be configured to at least partially absorb force at the door panel. Movement of the armrest section may comprise deformation in response to the event of the side impact. Movement of the armrest section may comprise movement of a crash structure of the armrest section. The armrest assembly may be configured to at least partially absorb force. Movement of the armrest section may comprise conversion of force into a translation movement relative to the door panel. The armrest assembly may be configured to at least partially reduce tension to reduce the likelihood of breakage of the armrest assembly in the event of the side impact. The armrest assembly may be configured to at least partially reduce tension by movement of the armrest section relative to the base section to reduce the likelihood of breakage of the armrest assembly in the event of the side impact. The region of the armrest assembly may be configured to be at least partially aligned with the occupant in the seat of the vehicle. The armrest assembly may comprise a mechanism configured to attach the armrest section to the door panel. The mechanism may comprise a set of slots and a set of pins movable within the set of slots so that response in the event of the side impact at the door panel may comprise movement of the set of pins within the set of slots to provide for movement of the armrest section relative to the base section. The mechanism may be configured to at least partially absorb force at the door panel in response in the event of the side impact at the door panel. Response at the armrest assembly in the event of the side impact at the door panel may comprise movement of the armrest section to at least partially shield the occupant from an edge of the base section. The door panel may comprise an integrated carrier configured to attach the armrest section to the door panel. The carrier may be configured to guide movement of the armrest section while maintaining the armrest section attached to the door panel. The armrest assembly may comprise a carrier configured to attach the armrest section to the door panel. Response in the event of the side impact at the door panel may be configured to comprise movement of the armrest section relative to the carrier. The armrest section may be coupled to the carrier by a mechanism configured to allow for movement of the armrest section relative to the carrier. The mechanism may comprise a set of slots and a set of pins movable within the set of slots so that response in the event of the side impact at the door panel may comprise movement of the set of pins within the set of slots to provide for movement of the armrest section relative to the carrier. The set of slots may be provided on the carrier. The carrier may comprise the region of the armrest assembly. Movement of the armrest section may be configured to comprise translation relative to the door panel. Movement of the armrest section may be configured to comprise a deformation. The armrest section may comprise the region of the armrest assembly. The region of armrest assembly may comprise a deformable region. The armrest section may comprise the deformable region. The deformable region may comprise a structure. The deformable region may comprise a structure of the armrest section. The armrest assembly further may comprise a carrier to attach the armrest section to the door panel. The carrier may comprise the region of the armrest assembly. The region may comprise a deformable region. The deformable region may comprise a structure on the carrier. The deformable region may comprise a web. The deformable region may comprise a web on the carrier. The deformable region may comprise a structure on the armrest section of the armrest assembly. The region of the armrest assembly may be configured to be at least partially aligned at an elbow of the occupant in the seat of the vehicle. The region of the armrest assembly may be configured to be at least partially aligned above a hip of the occupant in the seat of the vehicle. The armrest section may comprise a cover. The cover of the armrest section may comprise a pad. The component may comprise a compartment on the door panel. The compartment may comprise a map pocket assembly comprising a cover and a carrier configured to at least partially absorb impact in response to the event of the side impact at the door panel. The compartment may be configured to be at least partially aligned with the occupant in the seat of the vehicle. The compartment may be configured to be at least partially aligned with a hip of the occupant in the seat of the vehicle. Movement of the base section in the event of the side impact at the door panel may be configured to comprise movement of the base section relative to the armrest section to at least partially cover the armrest section.

According to an exemplary embodiment as shown schematically in FIGS. 2, 7A-7B, 11A-11B, 13A-13C, 15A-15C, 17, 18A-18B, 19A-19B, 20A-20C, 21A-21C, 24A-24B, 25A-25C, 30A-30B and 31A-31C, a component for an interior of a vehicle configured to be provided adjacent to a seat for an occupant and for response in an event such as a side impact of the vehicle may comprise a door panel and an armrest assembly on the door panel. The armrest assembly may comprise a base section and an armrest section. The armrest assembly may comprise a region configured for response in the event of the side impact at the door panel. Response in the event of the side impact at the door panel may be configured to comprise movement of the base section. Movement of the base section in the event of the side impact at the door panel may be configured to comprise movement of the base section relative to the armrest section to at least partially cover the armrest section. The base section of the armrest assembly may comprise a frame and a cover; the armrest section of the armrest assembly may comprise a structure and a cover. The structure of the armrest section may be configured to move over the frame of the base section in the event of the side impact at the door panel. The armrest section of the armrest assembly may comprise a structure and a deformable pad.

According to an exemplary embodiment as shown schematically in FIGS. 2, 7A-7B, 11A-11B, 13A-13C, 15A-15C, 17, 18A-18B, 19A-19B, 20A-20C, 21A-21C, 24A-24B, 25A-25C, 30A-30B and 31A-31C, a component for an interior of a vehicle configured to be provided adjacent to a seat for an occupant and for response in an event such as a side impact of the vehicle may comprise a door panel and an armrest assembly on the door panel. The armrest assembly may comprise a base section and an armrest section. The armrest assembly may comprise a region configured for response in the event of the side impact at the door panel. Response in the event of the side impact at the door panel may be configured to comprise movement of the base section. Movement of the base section in the event of the side impact at the door panel may be configured to comprise movement of the base section relative to the armrest section and deformation at the region. The region may comprise a deformable structure on the armrest section. The component may comprise a carrier configured to connect the armrest section to the door panel; the region may comprise a deformable structure on the carrier.

According to an exemplary embodiment as shown schematically in FIGS. 2, 7A-7B, 11A-11B, 13A-13C, 15A-15C, 17, 18A-18B, 19A-19B, 20A-20C, 21A-21C, 24A-24B, 25A-25C, 30A-30B and 31A-31C, a component for an interior of a vehicle configured to be provided adjacent to a seat for a vehicle occupant and for response in an event such as a side impact of the vehicle may comprise a door panel, an armrest assembly on the door panel and a compartment on the door panel. The armrest assembly may comprise a base section and an armrest section and a carrier configured to attach the armrest section to the door panel. The armrest assembly may comprise a deformable region configured to deform in response in the event of the side impact at the door panel. The armrest assembly may comprise a mechanism configured to deform in response in the event of the side impact at the door panel. In response in the event of the side impact at the door panel the armrest section may be configured for movement relative to the base section. Movement of the armrest section relative to the base section in the event of the side impact at the door panel may comprise translation at the mechanism so that the armrest section at least partially covers the base section. In response in the event of the side impact the armrest assembly may be configured to at least partially absorb force at the door panel. The mechanism may comprise a set of slots and a set of pins movable within the set of slots. The carrier may comprise the set of slots of the mechanism. The mechanism may be configured to attach the armrest section to the carrier. The deformable region may comprise a structure on the armrest section of the armrest assembly. The armrest section may comprise a cover. The cover of the armrest section may comprise a pad.

Exemplary Embodiments—B

As indicated schematically according to an exemplary embodiment in the FIGURES, a vehicle interior component may comprise a trim panel. The component may comprise a main carrier and at least two segments. The segments may be coupled by at least one protrusion. A first segment may comprise an armrest carrier and a second segment may comprise a switch panel carrier or structural component. The switch panel carrier may be firmly coupled to the main carrier. The switch panel carrier may comprise a flexible extension. The flexible extension may be coupled to the armrest carrier. The armrest carrier may be movably coupled to the main carrier by means of a mounting. The mounting may comprise a frame, at least one flexible rib and at least one slotted hole. The mounting may comprise an interconnection of a door panel carrier and an armrest carrier. The mounting may be configured to absorb an external force on a door (e.g. in case of a side impact event). The mounting may be integrated into the door panel carrier.

| REFERENCE SYMBOL | ELEMENT, PART OR COMPONENT |
|---|---|
| V | vehicle |
| I | vehicle interior |
| VO | vehicle occupant |
| DR | door |
| DP | door panel |
| DF | door panel frame (main frame/carrier/substrate) |
| DC | door panel cover/mid-frame |
| DB | door panel part/bolster |
| ARA | armrest assembly |
| AR | armrest section (sub-assembly) |
| AB | armrest base/grab-bar section (sub-assembly) |
| F | force (impact/crash test) |
| RTA | impact/crash test barrier (mobile barrier) |
| RTB | impact/crash test barrier (side pole barrier) |
| AF | armrest frame (base) |
| AV | armrest cover (frame/base) |
| AC | armrest carrier/connector (armrest section) |
| AS | armrest structure/crash structure (armrest section) |
| AP | armrest pad/cover (sub-assembly) |
| AM | armrest mechanism (guide of movement) (deformation energy/force absorption) |
| CS | deformable region/area (impact-absorbing/crash structure) |
| CW | deformable region/web (impact-absorbing/crash structure) |
| MP | map pocket component/assembly |
| DM | connector (map pocket/structure) |
| FT | fastener |
| FP | fastener pin/post |
| FH | fastener head |
| SL | slot |
| RT | retainer/receptacle |
| PT | post |
| SP | switch panel (operator control elements/panel) |
| GH | armrest handle (grab handle for operator) |

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

The invention claimed is:

1. A component for an interior of a vehicle configured to be provided adjacent to a seat for an occupant and for response in an event such as a side impact of the vehicle comprising:
    (a) a door panel; and
    (b) an armrest assembly on the door panel;
    wherein the armrest assembly comprises a base section and an armrest section;
    wherein the armrest assembly comprises a region configured for response in the event of the side impact at the door panel;
    wherein the armrest assembly comprises a mechanism configured to attach the armrest section to the door panel;
    wherein response in the event of the side impact at the door panel is configured to comprise movement of the armrest section at the mechanism and relative to the base section.

2. The component of claim 1 wherein movement of the armrest section in the event of the side impact at the door panel is configured to comprise movement of the armrest section relative to the base section to at least partially cover the base section.

3. The component of claim 1 wherein movement of the armrest section comprises at least one of (a) sliding movement; (b) conversion of force into a translation movement relative to the door panel.

4. The component of claim 1 wherein the mechanism comprises a set of slots and a set of pins movable within the set of slots so that response in the event of the side impact at the door panel comprises movement of the set of pins within the set of slots to provide for movement of the armrest section relative to the base section.

5. The component of claim 1 wherein response at the armrest assembly in the event of the side impact at the door panel comprises movement of the armrest section to at least partially shield the occupant from an edge of the base section.

6. The component of claim 1 wherein the door panel comprises an integrated carrier configured to attach the armrest section to the door panel;

wherein the carrier is configured to guide movement of the armrest section while maintaining the armrest section attached to the door panel.

7. The component of claim 1 wherein the armrest assembly comprises a carrier configured to attach the armrest section to the door panel.

8. The component of claim 7 wherein response in the event of the side impact at the door panel is configured to comprise movement of the armrest section relative to the carrier.

9. The component of claim 7 wherein the armrest section is coupled to the carrier by the mechanism configured to allow for movement of the armrest section relative to the carrier; wherein the mechanism comprises a set of slots and a set of pins movable within the set of slots so that response in the event of the side impact at the door panel comprises movement of the set of pins within the set of slots to provide for movement of the armrest section relative to the carrier.

10. The component of claim 9 wherein the set of slots is provided on the carrier.

11. The component of claim 7 wherein the carrier comprises the region of the armrest assembly.

12. The component of claim 1 wherein the armrest assembly further comprises a carrier to attach the armrest section to the door panel; wherein the carrier comprises the region of the armrest assembly; wherein the region comprises a deformable region.

13. The component of claim 12 wherein the deformable region comprises a structure on the carrier.

14. The component of claim 12 wherein the deformable region comprises a web.

15. The component of claim 1 wherein movement of the base section in the event of the side impact at the door panel is configured to comprise movement of the base section relative to the armrest section to at least partially cover the armrest section.

16. A component for an interior of a vehicle configured to be provided adjacent to a seat for a vehicle occupant and for response in an event such as a side impact of the vehicle comprising:
    (a) a door panel;
    (b) an armrest assembly on the door panel; and
    (c) a compartment on the door panel;
    wherein the armrest assembly comprises a base section and an armrest section and a carrier configured to attach the armrest section to the door panel;
    wherein the armrest assembly comprises a deformable region configured to deform in response in the event of the side impact at the door panel;
    wherein the armrest assembly comprises a mechanism configured to deform in response in the event of the side impact at the door panel;
    wherein in response in the event of the side impact at the door panel the armrest section is configured for movement relative to the base section;
    wherein movement of the armrest section relative to the base section in the event of the side impact at the door panel comprises translation at the mechanism and directed at an interface between the armrest section and the base section so that the armrest section at least partially covers the base section;
    wherein in response in the event of the side impact the armrest assembly is configured to at least partially absorb force at the door panel.

17. The component of claim 16 wherein the mechanism comprises a set of slots and a set of pins movable within the set of slots.

18. The component of claim 17 wherein the carrier comprises the set of slots of the mechanism.

19. The component of claim 16 wherein the mechanism is configured to attach the armrest section to the carrier.

20. A component for an interior of a vehicle configured to be provided adjacent to a seat for an occupant and for response in an event such as a side impact of the vehicle comprising:
   (a) a door panel; and
   (b) an armrest assembly on the door panel;
   wherein the armrest assembly comprises a base section and an armrest section;
   wherein the armrest assembly comprises a region configured for response in the event of the side impact at the door panel;
   wherein the armrest assembly comprises a carrier configured to attach the armrest section to the door panel;
   wherein the armrest section is coupled to the carrier by a mechanism configured to allow for movement of the armrest section relative to the carrier and relative to the base section;
   wherein response of the armrest assembly in the event of the side impact at the door panel is configured to comprise movement of the armrest section at the mechanism providing movement of the armrest section relative to the base section.

* * * * *